US011605136B1

(12) United States Patent
Agrawal et al.

(10) Patent No.: US 11,605,136 B1
(45) Date of Patent: Mar. 14, 2023

(54) PROVIDING DIAGNOSTICS REGARDING DIFFERENCES BETWEEN TRUSTED RESOURCE VALUES AND HISTORICAL RESOURCE VALUES

(71) Applicant: Avalara, Inc., Seattle, WA (US)

(72) Inventors: Naveen Kumar Agrawal, Bellevue, WA (US); Gregory T. Kavounas, Bellevue, WA (US)

(73) Assignee: AVALARA, INC., Seattle, WA (US)

( * ) Notice: Subject to any disclaimer, the term of this patent is extended or adjusted under 35 U.S.C. 154(b) by 251 days.

(21) Appl. No.: 17/071,823

(22) Filed: Oct. 15, 2020

Related U.S. Application Data

(60) Provisional application No. 62/916,058, filed on Oct. 16, 2019.

(51) Int. Cl.
| | | |
|---|---|---|
| G06Q 40/00 | (2012.01) | |
| *G06Q 40/10* | (2023.01) | |
| *G06F 16/21* | (2019.01) | |
| *G06Q 30/018* | (2023.01) | |
| *G06Q 30/0601* | (2023.01) | |

(52) U.S. Cl.
CPC .......... *G06Q 40/10* (2013.01); *G06F 16/219* (2019.01); *G06Q 30/018* (2013.01); *G06Q 30/0607* (2013.01)

(58) Field of Classification Search
CPC .................................................... G06Q 40/10
USPC .......................................................... 705/35
See application file for complete search history.

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 8,156,019 B2 * | 4/2012 | Wilson ................ G06Q 40/123 705/31 |
| 8,620,578 B1 | 12/2013 | Brown et al. |

(Continued)

OTHER PUBLICATIONS

A Calculation Model for the Serviceable Evaluation of User Online Comment 2015 IEEE International Conference on Smart City/SocialCom/SustainCom (SmartCity) (pp. 1117-1121) Authors: Jing Yang • Taiming Wang • Jun Wang (Year: 2015).*

(Continued)

*Primary Examiner* — Bruce I Ebersman
*Assistant Examiner* — John A Anderson
(74) *Attorney, Agent, or Firm* — Jeremiah J. Baunach; VLP Law Group LLP

(57) ABSTRACT

In embodiments, diagnostics are electronically determined and provided as to why historical resource values differ from resource values determined according to more-trusted ways. Historical relationship instance data regarding a plurality of historical relationship instances between a primary entity and a plurality of secondary entities are received along with a plurality of historical resource values, in which each historical relationship instance of the plurality of historical relationship instances is associated with a respective historical resource value of the plurality of historical resource values. The system produces a respective trusted resource values based on the respective historical relationship instance. Based on differences between the respective trusted resource value and the respective historical resource value associated with the dataset, the system outputs one or more diagnostic comments associated with the detected difference.

22 Claims, 12 Drawing Sheets

(56) References Cited

U.S. PATENT DOCUMENTS

| | | | |
|---|---|---|---|
| 8,725,407 B2 | 5/2014 | Hurley et al. | |
| 9,760,915 B2 | 9/2017 | Pavlou et al. | |
| 10,445,818 B1 | 10/2019 | Chowdhary | |
| 10,769,611 B2 | 9/2020 | McNeel | |
| 10,872,100 B1 | 12/2020 | Shefferman et al. | |
| 11,172,620 B2 | 11/2021 | Lubczynski et al. | |
| 11,176,620 B1 * | 11/2021 | Lubczynski | G06Q 40/123 |
| 2002/0138765 A1 | 9/2002 | Fishman et al. | |
| 2007/0055571 A1 | 3/2007 | Fox et al. | |
| 2007/0136158 A1 | 6/2007 | Rawlings et al. | |
| 2007/0136159 A1 | 6/2007 | Rawlings et al. | |
| 2009/0187500 A1 | 7/2009 | Wilson et al. | |
| 2013/0013471 A1 * | 1/2013 | Fishman | G06Q 40/00 705/31 |
| 2014/0172656 A1 | 6/2014 | Shaw | |
| 2014/0244454 A1 | 8/2014 | Grimes et al. | |
| 2014/0289386 A1 * | 9/2014 | Vatto | H04L 41/145 709/223 |
| 2014/0337189 A1 * | 11/2014 | Barsade | G06Q 40/123 705/31 |
| 2014/0351105 A1 * | 11/2014 | Hamm | G06F 16/13 705/31 |
| 2016/0042466 A1 | 2/2016 | Herndon et al. | |
| 2017/0068923 A1 | 3/2017 | Kenkre et al. | |
| 2017/0154384 A1 | 6/2017 | Schroeder et al. | |
| 2019/0114609 A1 * | 4/2019 | Burton | G06Q 20/202 |

OTHER PUBLICATIONS

Text mining based on tax comments as big data analysis using SVM and feature selection (Year: 2018).*

* cited by examiner

| Detected Difference | Transaction Tax Self-Audit Tool Diagnostic Comment |
|---|---|
| Historical amount is zero, but new amount is not zero | Are you sure that your provider checked whether a certificate of exemption has expired?<br><br>Are you sure that your provider checked that there are no tax holidays in this jurisdiction? And maybe TAX COLLECTED |
| Historical amount is not zero, but new amount is zero | Are you sure that your provider checked whether there is tax holiday in this jurisdiction?<br><br>Are you sure that your provider checked whether there is a certificate of exemption is in place? |
| Historical amount differs from new amount | Are you sure that your provider used the right tax rate for this jurisdiction?<br><br>Are you sure that your provider used the right jurisdiction in the first place?<br><br>Are you sure that your provider was aware that the jurisdiction changed its rates?<br><br>Are you sure that your provider was aware that the jurisdiction changed its geographical boundaries? |
| Tax not collected in a jurisdiction, but should have been | Are you sure that you are not liable for collecting tax for this jurisdiction? |
| Customer exempted without certificate on record | Are you sure that you have proof of exemption from your customer for these transactions where you exempted them from sales tax? |
| Special taxability considerations missed | Are you sure that these items do not qualify for special taxability consideration? |
| Additional taxes and fees missed | Are you sure that your provider calculated all other types of taxes and fees applicable in addition to sales tax on these transactions? |
| Discrepancy between tax quoted vs collected | Do you know you had quoted x amount of tax to your customer, but you collected y? |

| Diagnostic code | Transaction Tax Self-Audit Tool Diagnostic Comment |
|---|---|
| DXC1 | Are you sure that your provider checked whether a certificate of exemption has expired?<br><br>Are you sure that your provider checked that there are no tax holidays in this jurisdiction? And maybe |
| DXC2 | Are you sure that your provider checked whether there is tax holiday in this jurisdiction?<br><br>Are you sure that your provider checked whether there is a certificate of exemption is in place? |
| DXC3 | Are you sure that your provider used the right tax rate for this jurisdiction?<br><br>Are you sure that your provider used the right jurisdiction in the first place?<br><br>Are you sure that your provider was aware that the jurisdiction changed its rates?<br><br>Are you sure that your provider was aware that the jurisdiction changed its geographical boundaries? |
| DXC4 | Are you sure that you are not liable for collecting tax for this jurisdiction? |
| DXC5 | Are you sure that you have proof of exemption from your customer for these transactions where you exempted them from sales tax? |
| DXC6 | Are you sure that these items do not qualify for special taxability consideration? |
| DXC7 | Are you sure that your provider calculated all other types of taxes and fees applicable in addition to sales tax on these transactions? |
| DXC8 | Do you know you had quoted x amount of tax to your customer, but you collected y? |

FIGURE 11

PROVIDING DIAGNOSTICS REGARDING DIFFERENCES BETWEEN TRUSTED RESOURCE VALUES AND HISTORICAL RESOURCE VALUES

CROSS REFERENCE TO RELATED PATENT APPLICATIONS

This patent application claims priority from U.S. provisional patent application Ser. No. 62/916,058 filed Oct. 16, 2019.

BRIEF SUMMARY

The present description gives instances of computer systems and storage media that may store programs and methods, the use of which may help overcome problems and limitations of the prior art.

In embodiments, historical relationship instance data regarding a plurality of historical relationship instances between a primary entity and a plurality of secondary entities are received along with a plurality of historical resource values. Each historical relationship instance of the plurality of historical relationship instances is associated with a respective historical resource value of the plurality of historical resource values. The system produces a respective trusted resource value based on the respective historical relationship instance. Based on differences detected between the respective trusted resource value and the respective historical resource value associated with a dataset, the system outputs one or more diagnostic comments associated with the detected difference. This provides diagnostics as to why historical resource values differ from resource values determined according to more-trusted ways.

An advantage and improvement is that the primary entity may more efficiently and more accurately procure values for its earlier-computed values, if it subsequently loses confidence in them, and also receive accurate reasons as to why such differences occurred to avoid wasting time, effort and digital resources to address such variances going forward.

Providing, in a timely and efficient manner, accurate and reliable determination diagnostics as to why historical resource values differ from resource values determined according to more-trusted ways presents a technical problem for current Enterprise Resource Planning (ERP) software applications. This problem is exacerbated when multiple different digital rules must be applied to the same dataset associated with a particular relationship instance in order to remit resources to multiple different domains associated with the particular relationship instance.

The present disclosure provides systems, devices, computer-readable media and methods that solve these technical problems by increasing the speed, efficiency and accuracy of such specialized software platforms and computer networks, thus improving the technology of ERP software applications and accounting applications.

Therefore, the systems and methods described herein for electronically providing diagnostics regarding differences between trusted resource values and historical resource values improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to provide diagnostics regarding differences between trusted resource values and historical resource values.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 9 is a table of sample of detected differences between transaction tax amounts collected and trusted transaction tax amounts, which are each associated sample transaction tax self-audit tool diagnostic comments based on those differences according to embodiments.

FIG. 11 is a table of the sample transaction tax self-audit tool diagnostic comment codes of FIG. 10, which are each associated with a sample transaction tax self-audit tool diagnostic comment according to embodiments.

DETAILED DESCRIPTION

As has been mentioned, the present description is about providing diagnostics as to why historical resource values differ from resource values determined according to more-trusted ways. These differences are also called variances. Embodiments are now described in more detail.

Figure 1:
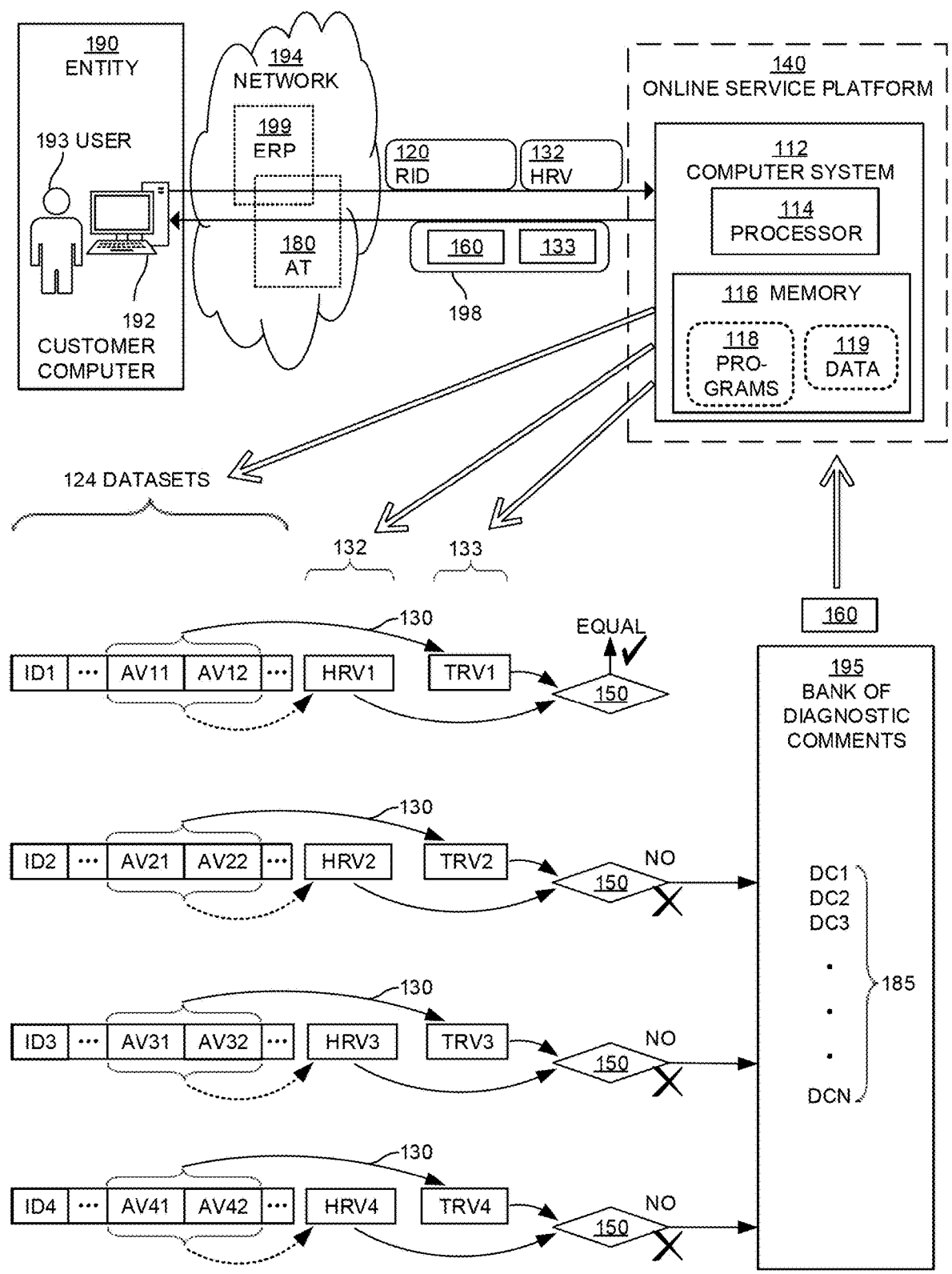
FIG. 1 is a mixed diagram of sample elements according to embodiments.

FIG. 1 shows aspects of a sample computer system 112 according to embodiments. The computer system 112 includes at least a processor 114 and a memory 116. There can be one or more processors, but only one processor 114 is shown. The memory 116 can be a non-transitory computer-readable storage medium. The memory 116 can be configured to store programs 118 and data 119. Programs 118 can include instructions which, when executed by processor 114, result in operations of embodiments. More details about how the computer system 112 can be made are provided with reference to FIG. 7.

The computer system 112 may download historical relationship instance data (RID) 120 regarding a plurality of historical relationship instances between a primary entity, such as customer entity 190, and a plurality of secondary entities (not shown). The RID 120 includes datasets 124. Each dataset of datasets 124 represents a respective historical relationship instance between the customer entity 190 and one of these secondary entities.

The computer system 112 may also download historical resource values (HRV) 132 from customer computer 192. Each historical relationship instance of the historical relationship instances is associated with a respective historical resource value included in HRV 132. The customer computer 192 may be part of customer entity 190 that includes a human user 193. The human user 193 may have given permission to the computer system 112 to download the RID 120 and HRV 132. The datasets 124 and HRV 132 can be received in one or more requests traveling via the communications network 194, one dataset per request or distributed among multiple requests. In some embodiments, the datasets 124 and the HRV 132 are received together and/or the HRV 132 are part of the datasets 124. In some other embodiments, the HRV 132 may be received by the computer system 112 from another entity or system.

In terms of context, in some embodiments the computer system 112 is part of an online service platform (OSP) 140, which can be software as a service (SaaS) provided to the customer entity 190. In such embodiments, the datasets 124 and HRV 132 may be downloaded via a communications network 194, such as the internet. The datasets 124 and HRV 132 may be downloaded from where user 193 has opted to store them. That can be the customer computer 192 itself, or one or more Enterprise Resource Planning (ERP) systems, such as ERP 199, which are accessible again via the communications network 194. ERP systems help businesses collect information relating to their operations, such as production, resource management, inventory management, sales, delivery, billing, and other operations. For purposes of this disclosure, ERP systems may also include accounting, virtual shopping cart, customer relationship management (CRM) and/or point-of-sale (POS) applications and systems that help businesses with their accounting information, such as payroll, purchase orders, accounts payable, sales invoices, accounts receivable, and so on. In the example embodiment shown in FIG. 1, the datasets 124 and HRV 132 may be downloaded from ERP 199 with automated assistance from an audit tool (AT) 180. In some embodiments, the AT 180 is a tool provided by the OSP 140 and downloaded by the customer entity 190 as a local or online plugin, web service tool, or other application. The AT 180 may integrate with a number of different ERPs, such as ERP 199 and, upon installation or other activation and authorization by the customer entity 190, automatically extract applicable RID 120 and HRV 132 from the ERP 199 and transmit such data to computer system 112.

For example, in some embodiments, the AT 180 is (or includes) a connector (not shown), which is a plugin that sits on top of the ERP 199. The connector may be able to fetch from the customer computer and/or ERP 199 the RID 120 and HRV 132, and then send or push the RID 120 and HRV 132 to the OSP 140 via a service call. The OSP 140 may receive the RID 120 and HRV 132 and then process that data to look up, based on the RID 120 and HRV 132, one or more diagnostic comments 160 of the stored diagnostic comments 185 included in the bank of diagnostic comments 195. The OSP 140 may then push, send, or otherwise cause to be transmitted the diagnostic comments 160 to the connector in a message 198. The connector inputs the diagnostic comments 160 and forwards the diagnostic comments 160 to the AT 180 and/or customer computer 192.

The AT 180 and/or customer computer 192 thus causes at least some of the diagnostic comments 160 to be presented on a user interface of customer computer 192. Such diagnostic comments 160 may be transmitted (e.g., via message 198) and presented on the user interface of customer computer 192 with or in the context of other data generated, provided and/or otherwise produced by the OSP 140, such as the trusted resource values (TRV) 133 associated with the datasets 124, as explained further below. In some embodiments the AT 180 is part of the OSP 140, which can be implemented as software as SaaS provided to the customer entity 190, either directly or via the ERP 199.

In some embodiments, some or all of the AT 180 is located and running on customer computer 192. For example, the computer system 112 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the customer entity 190 to directly consume a REST API from their particular application or AT 180 running on customer computer 192, without using a connector. The AT 180 or other application of the customer computer 192 may be able to fetch internally from the customer computer 192 the details required for the service desired from the OSP 140, and thus send or push the RID 120 and/or HRV 132 to the REST API. In turn, the REST API talks in the background to the computer system 112. Again, the OSP 140 processes the RID 120 and/or HRV 132 to look up diagnostic comments 160, and sends the diagnostic comments 160 back to the REST API. In turn, the REST API sends the message that has the diagnostic comments 160 to the particular application or AT 180.

The example of FIG. 1 shows details of four sample datasets 124. These datasets 124 have a first parameter value that serves as an identification number, as is preferred but not required. Here the identification numbers are ID1, ID2, ID3, ID4. The first dataset has other parameters that include ancillary parameter values AV11, AV12; the second dataset has other parameters that include ancillary parameter values AV21, AV22; the third dataset has other parameters that include ancillary parameter values AV31, AV32; and the fourth dataset has other parameters that include ancillary parameter values AV41, AV42. These datasets 124 may also have (or be associated with) respective historical resource values, HRV1, HRV2, HRV3, HRV4, also designated as 132. These HRV 132 may have been determined from at least one of the one or more ancillary parameter values of their dataset.

These HRV 132 have not been determined by the computer system 112, or the OSP 140. As such, there can be a lack of confidence in the accuracy of each of these HRV 132, compared to the expected accuracy of resource values that the computer system 112, or the OSP 140 may determine, as the latter may use ways that for the determination that are more trusted than others. Here, the less-trusted determination has been made for entity 190 by its computer 192 or the ERP 199. If the entity 190 suspects errors in these HRV 132, then the entity 190 may engage the computer system 112, or the OSP 140, such as via the AT 180.

For example, trusted resource values (TRV) 133 may be determined or otherwise produced by the OSP 140. As seen in FIG. 1, operation 130 determines or otherwise produces TRV 133. The TRV 133 may be produced for at least some of the one or more datasets 124. As such, the TRV 133 are associated with the HRV 132. In this example, there is one trusted resource value TRV1, TRV2, TRV3, TRV4 for each of the four datasets 124. The production of each of the TRV 133 may be performed from at least one of the ancillary parameter values of the one or more datasets. It will be observed that, in embodiments, a trusted resource value TRVn (n=1-4) for a certain dataset is thus determined or otherwise produced from the same ancillary parameter values that the HRVn value associated with the dataset was determined. This is not necessary, however, and in fact the trusted resource value for a certain dataset can be thus not determined from the same ancillary parameter values that the historical resource value of the dataset was determined. Different digital rules or considerations may apply that were not known to the party that determined the historical resource value, and so on.

In some embodiments, one of the one or more datasets 124 may be stored by the computer system 112, for example in a memory. The datasets 124 may be thus stored along with their determined respective TRV 133. In such embodiments they can be available for later look-up. For example, in embodiments where at least some of the previously received datasets are stored in the computer system 112, and each of the datasets includes an identification number, then it can be determined that the earlier version of the certain dataset has been previously received from the identification number of the certain dataset, for example by matching the identification number.

As shown in FIG. 1, there may be detecting, for at least some of the datasets 124, of differences between their respective trusted resource values and their respective historical resource values. Detecting may be performed by computer system 112, for example. As seen in FIG. 1, operations 150 detect, for the datasets 124, differences between trusted resource values TRV1, TRV2, TRV3, TRV4 and their respective historical resource values HRV1, HRV2, HRV3, HRV4. For example, the OSP 140 (or in some embodiments, the AT 180) may, for the datasets 124, compare the trusted resource values TRV1, TRV2, TRV3, TRV4 and their respective historical resource values HRV1, HRV2, HRV3, HRV4 in order to detect differences between them. In the case of HRV1, the two values are equal, as designated by a checkmark. In the other three cases the two values are not equal, as designated by cross-out mark, as described in more detail later in this document.

For the other three cases in which the two values are not equal, as designated by cross-out mark, the OSP 140 (or in some embodiments, the AT 180) may access the bank of diagnostic comments 195 and look up in the bank of diagnostic comments 195, based on the detected differences, one or more diagnostic comments 160 associated with one or more of the detected differences. For example, the bank of diagnostic comments 195 may have many stored diagnostic comments 185 referenced or identified as DC1, DC2 . . . DCN (e.g., in a database or other data structure) from which the OSP 140 may select, and only some of which are associated with a particular detected difference. In some embodiments, a particular diagnostic comment may give the user 193 a reason or clue as to the root cause of a particular detected difference, which could be a systemic problem to them.

In some embodiments, the comparison made to detect the difference between a respective trusted resource value and a respective historical resource value includes determining whether the respective trusted resource value is zero while the respective historical resource value is non-zero. For example, a particular diagnostic comment of stored diagnostic comments 185 may be looked up by the OSP 140 (or in some embodiments, the AT 180) responsive to the respective trusted resource value being zero while the respective historical resource value is non-zero in at least one of the datasets 124. Indeed, in the example of FIG. 1, for the dataset with identification number ID2, the trusted resource value TRV2 is zero while the respective historical resource value HRV2 is non-zero. As such, the stored diagnostic comment DC2, which may be already associated in the bank of diagnostic comments 195 with that type of detected difference, is looked up and may then be transmitted or otherwise output as (or as part of) diagnostic comments 160.

As another example, the comparison made to detect the difference between a respective trusted resource value and a respective historical resource value may include determining whether the respective trusted resource value is non-zero while the respective historical resource value is zero. For instance, a particular diagnostic comment of stored diagnostic comments 185 may be looked up by the OSP 140 (or in some embodiments, the AT 180) responsive to the respective trusted resource value being non-zero while the respective historical resource value is zero in at least one of the datasets 124. In the example of FIG. 1, for the dataset with identification number ID3, the trusted resource value TRV3 is non-zero while the respective historical resource value HRV3 is zero. As such, the stored diagnostic comment DC1, which may be already associated in the bank of diagnostic comments 195 with that type of detected difference, is looked up and may then be transmitted or otherwise output as (or as part of) diagnostic comments 160.

As yet another example, the comparison made to detect the difference between a respective trusted resource value and a respective historical resource value may include determining whether the respective trusted resource value differs from the respective historical resource value. For instance, a particular diagnostic comment of stored diagnostic comments 185 may be looked up by the OSP 140 (or in some embodiments, the AT 180) responsive to the respective trusted resource value differing in any way from the respective historical resource value in at least one of the datasets 124. In the example of FIG. 1, for the dataset with identification number ID4, the trusted resource value TRV4 differs from the respective historical resource value HRV4. As such, the stored diagnostic comment DC3, which may be already associated in the bank of diagnostic comments 195 with that type of detected difference, is looked up and may then be transmitted or otherwise output as (or as part of) diagnostic comments 160.

In some embodiments, in order to identify a particular diagnostic comment in the bank of diagnostic comments 195 based on a particular detected difference, in response to the detection there is a difference between a trusted resource value and its respective historical resource value, the OSP 140 or AT 180 may generate a diagnostic code from the detected difference. The looking up of the diagnostic comment in the bank of diagnostic comments 195 is then performed from this diagnostic code. For example, for the dataset with identification number ID2, the trusted resource value TRV2 may be zero while the respective historical resource value HRV2 is non-zero. In response to detecting this particular type of difference, the OSP 140 or AT 180 may generate a diagnostic code that is associated with that type of difference (i.e., a difference in which a trusted resource value is zero while its respective historical resource value is non-zero). This diagnostic code may also identify or otherwise be associated with a particular diagnostic comment that is to be used, for example, any time when it is detected a trusted resource value is zero while its respective historical resource value is non-zero. In the present example, the stored diagnostic comment DC2, is associated in the bank of diagnostic comments 195 with that particular diagnostic code, such that it may be looked up from that diagnostic code.

The diagnostic comments 160 can be made available to the customer entity 190, AT 180, ERP 199 and/or OSP 140 in a number of ways. For instance, as seen in the example of FIG. 1, diagnostic comments 160 are made available to the customer entity 190, by transmitting a message 198 to the AT 180, which presents or otherwise transmits the diagnostic comments 160 to customer entity 190 (e.g., within a user interface). Message 198 can be a data packet, a request, a response, a payload, email, text message, or other type of human or machine readable message. For another instance, the diagnostic comments 160 can be made available via a private user interface (UI) accessible by the user 193 of the customer entity 190. In such contexts, the user 193 may have to log in (e.g., via the AT 180 or ERP 199) to view one or more of these diagnostic comments 160, view a more detailed audit report including diagnostic comments 160 within the context of, or in conjunction with, the HRV 132 and TRV 133, and view the detected differences between the HRV 132 and TRV 133. For example, the message 198 may have a link that can be activated by customer entity 190, such as by user 193, to access the UI or additional diagnostic information.

Figure 2:
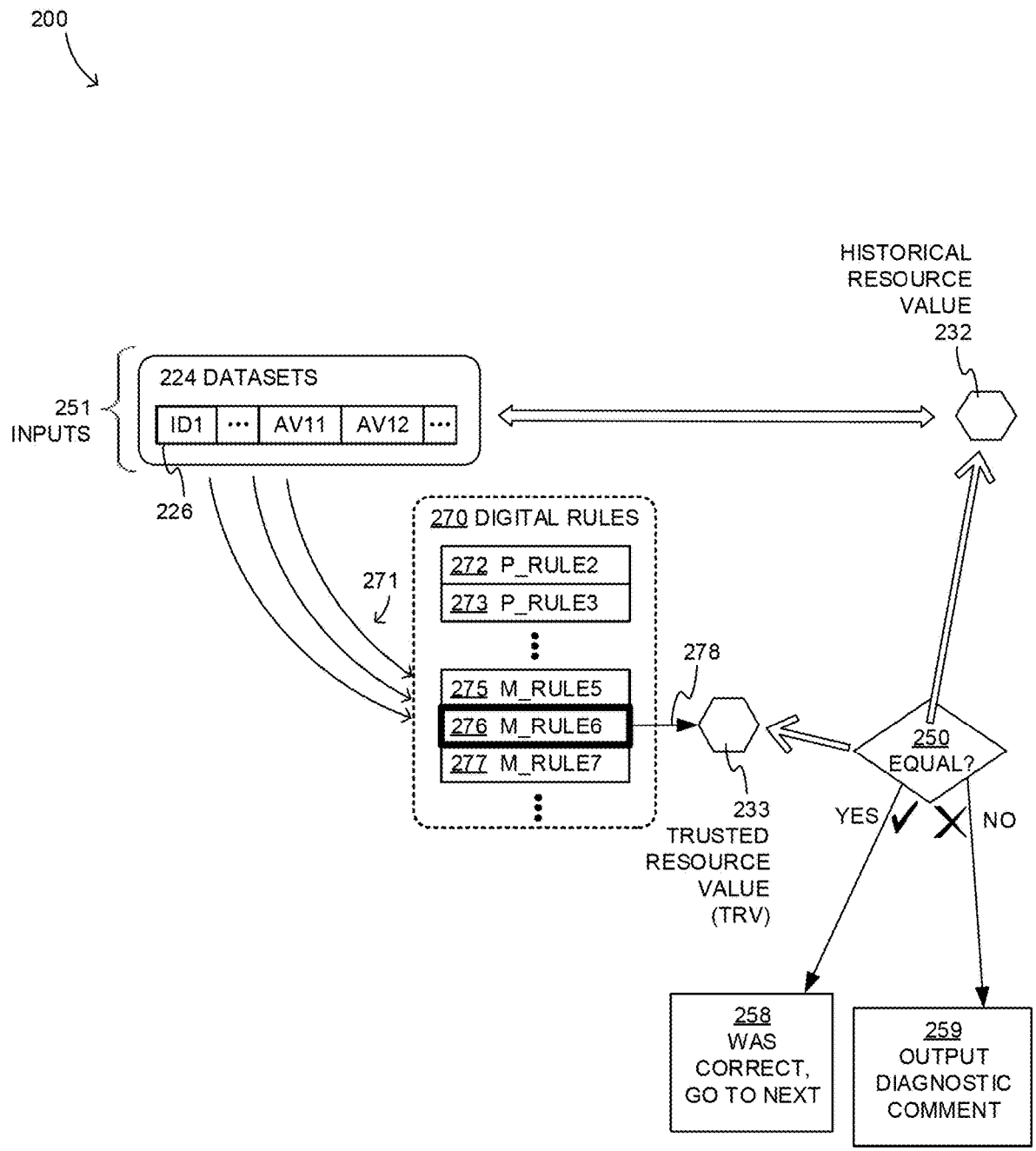
FIG. 2 is a context diagram of a system for using comparison of trusted resource values with respective historical resource values to select and output diagnostic comments according to embodiments.

FIG. 2 is a context diagram of a system 200 for using comparison of trusted resource values with respective historical resource values to select and output diagnostic comments according to embodiments. FIG. 2 illustrates an example of how the TRV 133 of FIG. 1 may be may be determined or otherwise produced in operation 130 by the OSP 140 or the AT 180 of FIG. 1. As mentioned earlier referring to FIG. 1, but now applied to the example shown in FIG. 2, the production of TRV 233 may be performed from at least one of the ancillary parameter values of dataset 226 of datasets 224. It will be observed that, in embodiments, TRV 233 for dataset 226 is thus determined or otherwise produced from the same ancillary parameter values (e.g., AV11, AV12) that the HRV 232 associated with dataset 226 was determined. This is not necessary, however, and in fact the trusted resource value for a certain dataset can be thus not determined from the same ancillary parameter values that the historical resource value of the dataset was determined. For example, different digital rules or considerations may apply that were not known to the entity that determined the HRV 232, and so on. However, such digital rules or considerations may be known and accessible by the OSP 140 or the AT 180 of FIG. 1, and thus a TRV 233 may be produced accordingly based on the dataset 226.

For example, in embodiments, stored digital rules 270 may be identified and accessed by the computer system 112 or AT 180. These stored digital rules 270 may be suitable for determining and producing the trusted resource values, such as TRV 233, using the ancillary parameter values (e.g., AV11, AV12). In such embodiments, TRV 233 can be determined based upon the identified stored digital rules 270. These digital rules 270 are digital in that they are implemented for use by software. For example, by receiving inputs 251 that include the datasets 224, these digital rules 270 may be implemented within programs 118 and data 138, and/or by AT 180 of FIG. 1. The data portion of these digital rules 270 may alternatively be implemented in memories in other places, which can be accessed via the network 194. These digital rules 270 may be accessed responsive to receiving a dataset, such as dataset 226.

The digital rules 270 may include main rules, which can thus be accessed by the computer system 112 or AT 180. In this example, three sample digital main rules are shown explicitly, namely M_RULE5 275, M_RULE6 276, and M_RULE7 277. In this example, the digital rules 270 also include digital precedence rules P_RULE2 272 and P_RULE3 273, which can thus be further accessed by the computer system 112 or AT 180. The digital rules 270 may include additional rules and types of rules, as suggested by the vertical dot-dot-dots.

In embodiments, a certain one of the digital main rules may be identified from among the accessed stored rules by the computer system 112 or AT 180. In particular, values of the dataset 226 can be tested, according to arrows 271, against logical conditions of the digital main rules. In this example, the certain main rule M_RULE6 276 is thus identified, which is indicated also by the beginning of an arrow 278. Identifying may be performed in a number of ways, and depending on how the digital main rules are implemented. For example, at least some of the digital main rules include respective conditions and respective consequents associated with the respective conditions, respectively. And, for a certain digital main rule, if its certain condition is met, then its certain consequent is what happens or becomes applied. Of course, one or more of the digital rules 270 may have more than one conditions that both must be met, and so on. And some of these digital rules 270 may be searched for, and grouped, according first to one of the conditions, and then the other.

Where more than one of the digital main rules are found that could be applied, there are additional possibilities. For instance, the computer system 112 of FIG. 1 may further access at least one stored digital precedence rule, such as P_RULE2 272 or P_RULE3 273. Accordingly, the certain digital main rule may be thus identified also from the digital precedence rule. In particular, the digital precedence rule may decide which one or more of the digital main rules is to be applied. To continue the previous example, if a value of the dataset 226 characterizes a location, and the location is within multiple overlapping regions according to multiple rules, the digital precedence rule may decide that all of them are to be applied, or less than all of them are to be applied. Equivalent embodiments are also possible, where digital precedence rules are applied first to limit an iterative search for digital main rules that could be applied, so as to test the applicability of fewer than all the rules according to arrows 271

In an embodiment, HRV 232 has been produced previously by a system that is not as reliable as the OSP 140 or AT 180. HRV 232 is associated with the dataset 226, as indicated by the long horizontal arrow. The HRV 232 and the dataset 226 are received by OSP 140 or AT 180 as part of inputs 251. In the present example, digital rules 270 are considered by the OSP 140 or AT 180 and digital main rule M_RULE6 276 is identified as applicable to dataset 226 as illustrated by the thicker boundary line of digital main rule M_RULE6 276. The OSP 140 or AT 180 then applies M_RULE6 276 to dataset 226 to produce respective TRV 233 associated with the dataset 226 based on the respective historical relationship instance represented by dataset 226.

At comparison operation 250, the OSP 140 or AT 180 determines whether TRV 233 is equal to HRV 232. If TRV 233 is equal to HRV 232 then the OSP 140 or AT 180 may determine that the HRV 232 is accurate and iterates at operation 258 to the next dataset in datasets 224 to perform this test; the operation 258 may be performed by selecting and applying the applicable digital rule form digital rules 270 to produce a respective TRV, and then comparing the respective TRV to the received respective HRV at operation 250. However, if the TRV 233 is not equal to HRV 232, then at operation 259 the OSP 140 or AT 180 outputs a diagnostic comment associated with the TRV 233 being not equal to HRV 232.

Figure 3:
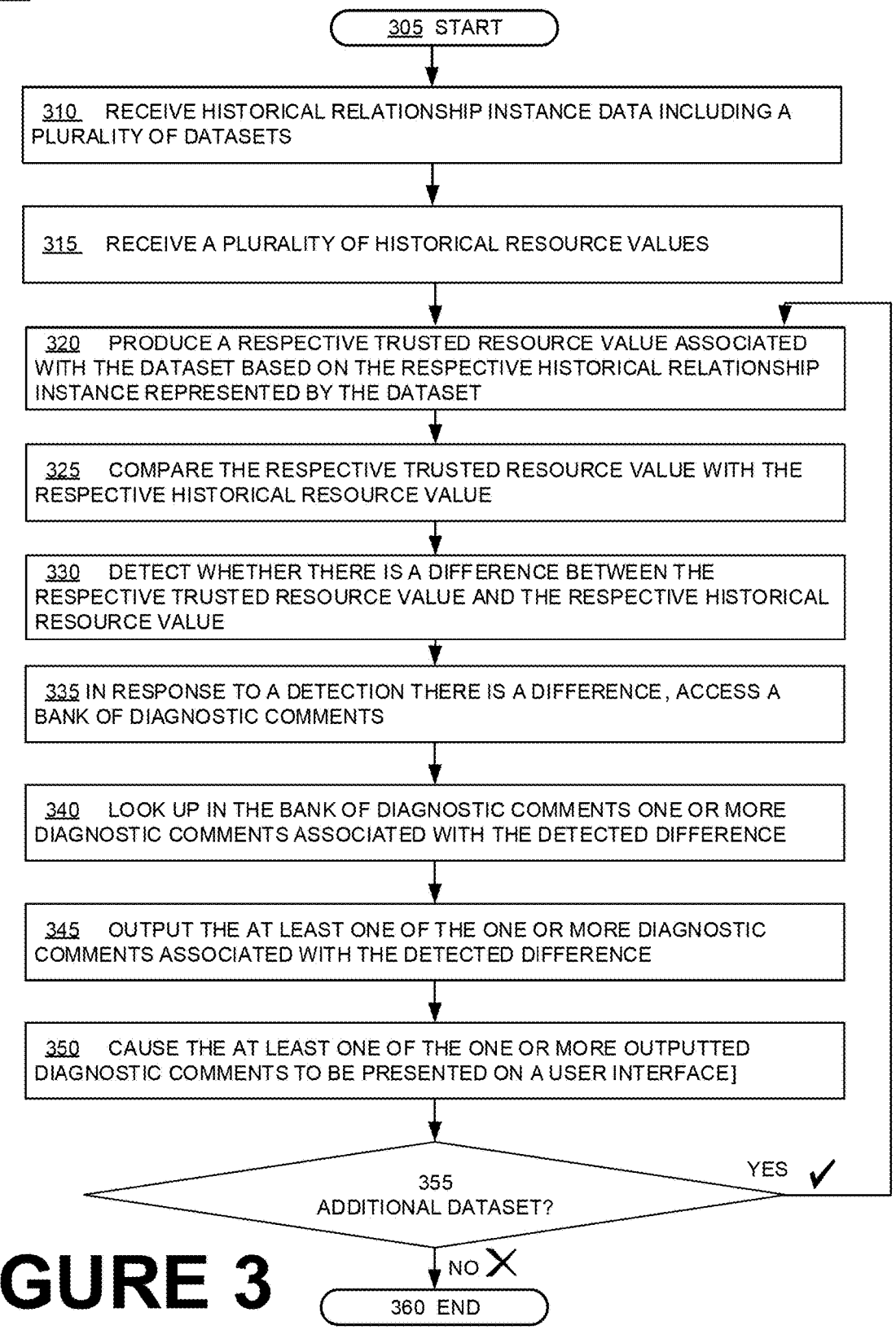
FIG. 3 is a flowchart illustrating a sample method using comparison of trusted resource values with respective historical resource values to select and output diagnostic comments according to embodiments.

FIG. 3 is a flowchart illustrating a sample method 300 using comparison of trusted resource values with respective historical resource values to select and output diagnostic comments according to embodiments. The method 300 illustrates an example method that may be performed in accordance with the system and operations shown in FIG. 2. Portions of the method 300 may be performed by the OSP 140, the AT 180 and so on, even though the example below is described with reference to the OSP 140.

The method 300 may begin at 305. At operation 310, the OSP 140 receives, from a system associated with a primary entity, historical relationship instance data regarding a plurality of historical relationship instances between the primary entity and a plurality of secondary entities. The historical relationship instance data includes a plurality of datasets and each dataset of the plurality of datasets represents a respective historical relationship instance of the plurality of historical relationship instances.

At operation 315, the OSP 140 receives, from the system associated with the primary entity, a plurality of historical resource values. Each historical relationship instance of the plurality of historical relationship instances is associated with a respective historical resource value of the plurality of historical resource values.

At operation 320, the OSP 140 produces a respective trusted resource value associated with the dataset based on the respective historical relationship instance represented by the dataset.

At operation 325, the OSP 140 compares the respective trusted resource value with the respective historical resource value associated with the dataset.

At operation 330, the OSP 140, based on the comparison, detects whether there is a difference between the respective trusted resource value and the respective historical resource value associated with the dataset.

At operation 335, the OSP 140, in response to a detection there is a difference between the respective trusted resource value and the respective historical resource value associated with the dataset, accesses a bank of diagnostic comments.

At operation 340, the OSP 140 then looks up in the bank of diagnostic comments, based on the detected difference, one or more diagnostic comments associated with the detected difference.

At operation 345, the OSP 140 outputs the at least one of the one or more diagnostic comments associated with the detected difference.

At operation 350, the OSP 140 causes the at least one of the one or more outputted diagnostic comments to be presented on a user interface.

At operation 355, the OSP 140 determines whether there is an additional dataset in the plurality of datasets to be processed. If it is determined there is an additional dataset in the plurality of datasets to be processed, then the method 300 proceeds back to 320 to produce a respective TRV associated with that dataset. If it is determined there is not an additional dataset in the plurality of datasets to be processed, then the method 300 may end at 360.

Figure 4:
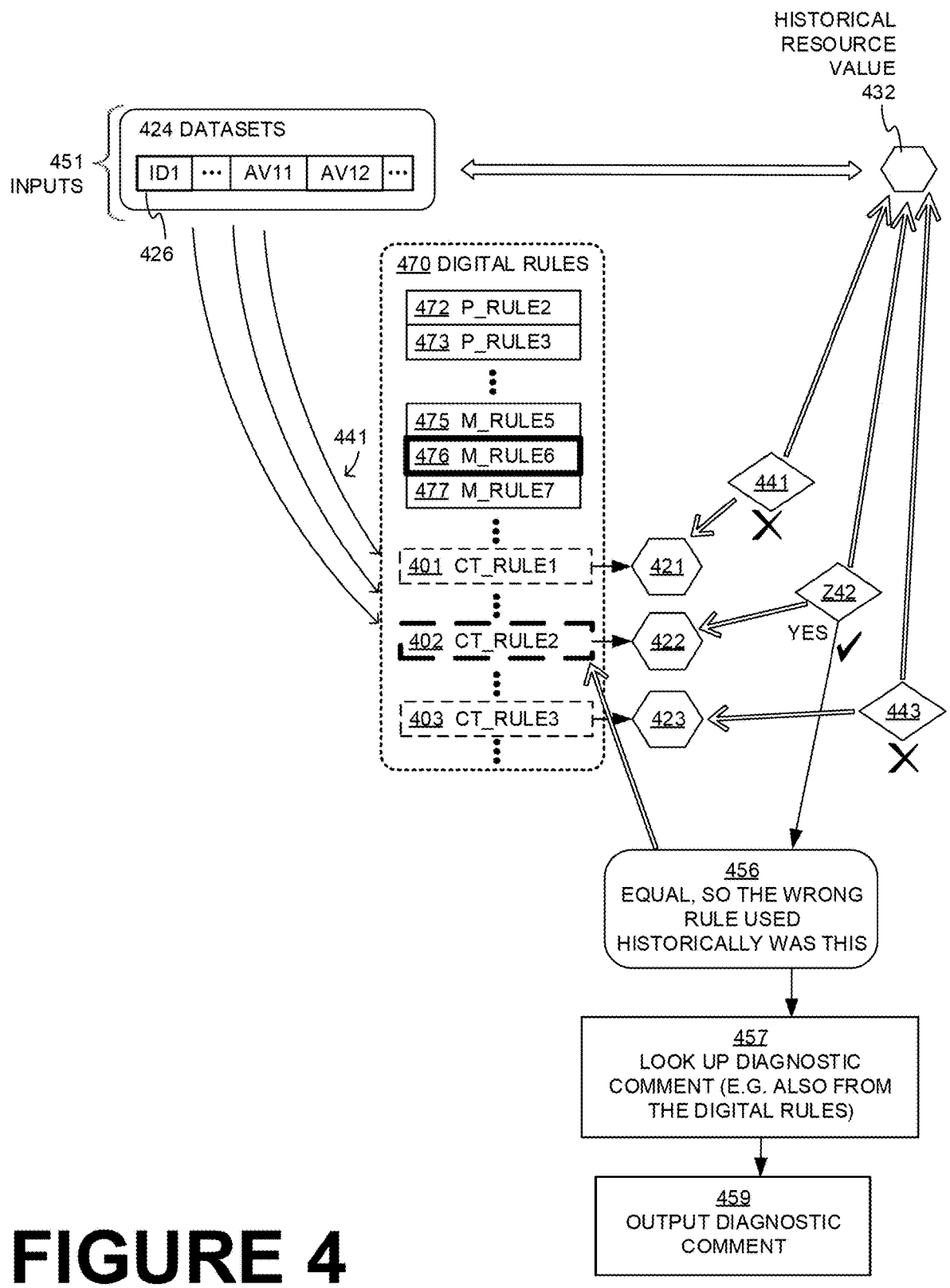
FIG. 4 is a context diagram of a system for selecting diagnostic comments based on applying candidate digital test rules to datasets according to embodiments.

FIG. 4 is a context diagram of a system for selecting diagnostic comments based on applying candidate digital test rules to datasets according to embodiments. In particular, FIG. 4 shows what may optionally further happen as a subsequent operation if, for example, in FIG. 2, the answer at comparison 250 is NO (i.e., if the TRV 233 is not equal to HRV 232).

The OSP 140 or AT 180 receives as inputs 451 datasets 424 and respective HRVs associated with datasets 424. Datasets 424 includes dataset 426 and dataset 426 is associated with a respective HRV 432. In the present example, OSP 140 or AT 180 has selected digital rule M_RULE6 476 that is deemed applicable to the historical relationship instance represented by dataset 426, and has thus produced a respective TRV for the relationship instance by applying digital rule M_RULE6 476 to the dataset 426. However, the OSP 140 or AT 180 has determined that HRV 432 does not match the respective TRV that was produced, and thus proceeds to look up a diagnostic comment to provide a possible reason or root cause for the mismatch.

In order to find the correct diagnostic comment, the OSP 140 or AT 180 determines a digital rule which may have been the rule that was wrongly selected or applied by another system to the dataset 426 to produce the HRV 432. The OSP or AT 180 may do this by iterating through the digital rules to find the one that produces the incorrect HRV 432 when applied to the dataset 426. For example, via arrows 441, the OSP or AT 180 selects, based on dataset 426, one or more candidate digital test rules CT_RULE1 401, CT_RULE2 402, CT_RULE3 403 and, for each selected candidate digital test rule, produces a respective test resource value based on applying the candidate digital test rule to the dataset 426. In the present example, OSP or AT 180 has produced test resource value 421 by applying CT_RULE1 401 to dataset 426, produced test resource value 422 by applying CT_RULE2 402 to dataset 426 and has produced test resource value 423 by applying CT_RULE3 403 to dataset 426.

The OSP or AT 180 further detects that a certain one of the respective test resource values, in this case test resource value 422, matches HRV 432. In particular, at operations 441 and 423, respectively, the OSP or AT 180 detects that test resource values 421 and 443 do not match HRV 432. However, at operation 422 the OSP or AT 180 detects that test resource value 422 matches HRV 432. In response to detecting that test resource value 422 matches HRV 432, the OSP or AT 180 determines at operation 456 that CT_RULE2 402 that was used to produce test resource value 422 is the rule that was wrongly selected or applied, and thus produced incorrect HRV 432. The OSP or AT 180 then, at operation 457, looks up a diagnostic comment in the bank of diagnostic comments 195 based on CT_RULE2 402.

In some embodiments, the diagnostic comment may be looked up based additionally on M_RULE6 476 that was identified as being applicable to dataset 426 to produce a trusted resource value for dataset 426. For example, M_RULE6 476 may be compared to CT_RULE2 402 to determine differences between the rules (e.g., different rates of each rule used to compute resource values) and the diagnostic comment looked up based on such differences. This is because the mismatch between the trusted resource value, produced by applying M_RULE6 476 to dataset 426, and the test resource value 422 (equaling HRV 432), produced by applying CT_RULE2 402 to dataset 426, may be attributable to such differences. At operation 459, the OSP 140 or AT 180 then outputs the looked up diagnostic comment.

Figure 5:
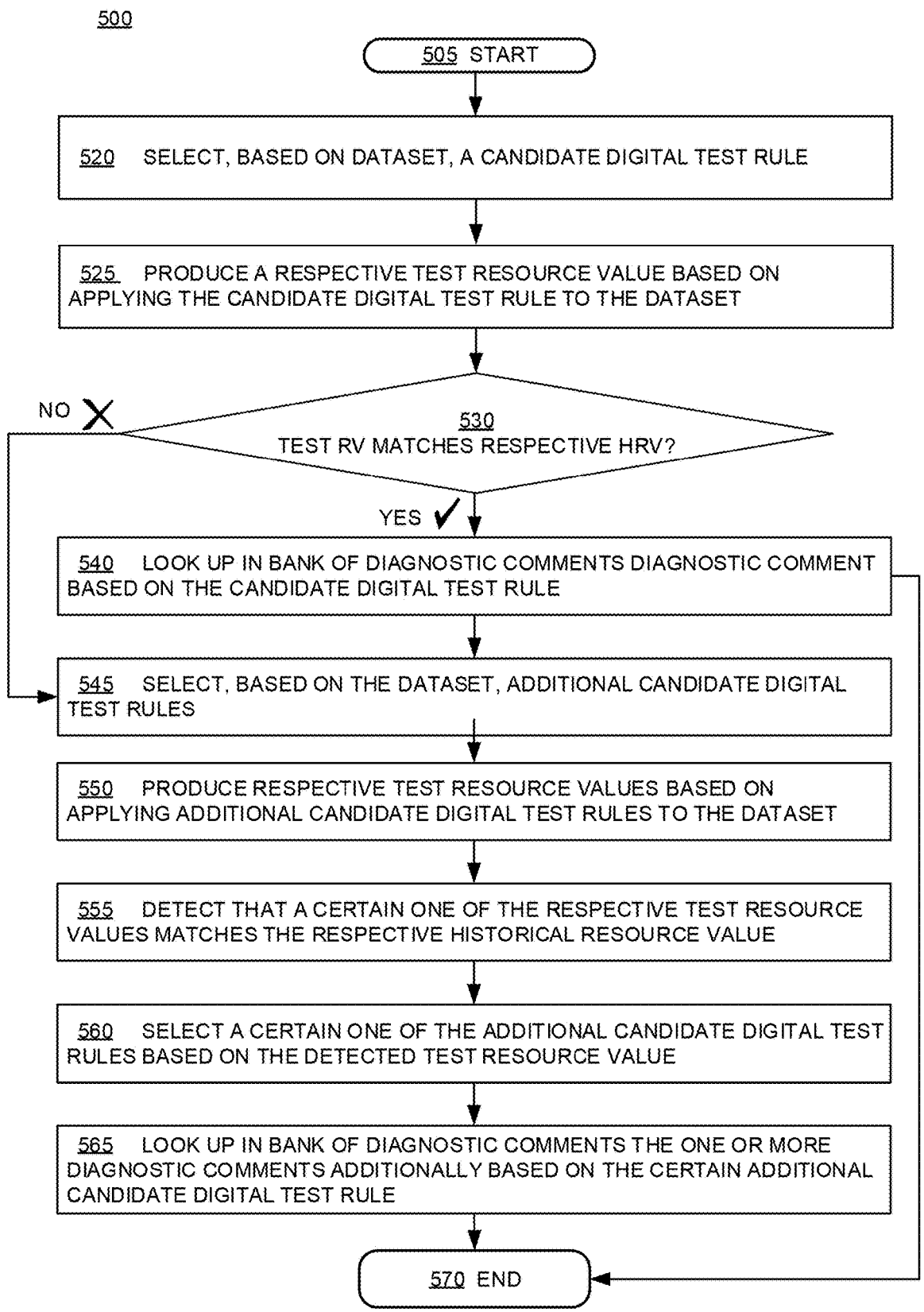
FIG. 5 is a flowchart illustrating a sample method for selecting diagnostic comments based on applying candidate digital test rules to datasets according to embodiments.

FIG. 5 is a flowchart illustrating a sample method 500 for selecting diagnostic comments based on applying candidate digital test rules to datasets according to embodiments. The method 500 illustrates an example method that may be performed in accordance with the system and operations shown in FIG. 4. In some embodiments, the method 500 may be applied within method 300 at operation 340 in looking up the diagnostic comment.

The method 500 may start at 505. At 520, the OSP 140 selects, based on a dataset, a candidate digital test rule. Once again, this candidate digital test rule is believed to be the wrong rule to apply for producing a resource value, and it is further an effort to guess the actual rule used to produce the wrong historical resource value.

At operation 525, the OSP 140 produces a respective test resource value based on applying the candidate digital test rule to the dataset.

At operation 530, the OSP 140 determines whether the test resource value matches a respective HRV of the dataset. If it is determined the test resource value matches a respective HRV of the dataset, then the method 500 proceeds to 540. If it is determined the test resource value does not match the respective HRV of the dataset, then the method 500 proceeds to 545.

At operation 540, the OSP 140, looks up in the bank of diagnostic comments one or more diagnostic comments additionally based on the candidate digital test rule. The method 500 may then end at 560.

At operation 545, the OSP 140 selects, based on the dataset, additional candidate digital test rules.

At operation 550, the OSP 140 produces respective test resource values based on applying the additional candidate digital test rules to the dataset.

At operation 555, the OSP 140 detects that a certain one of the respective test resource values matches the respective historical resource value.

At operation 560, the OSP 140 selects a certain one of the additional candidate digital test rules based on the detected test resource value. The inference can be made that, since the certain candidate digital test rule produced, at operation 555, the certain test resource value that matches the respective historical resource value, therefore that certain candidate digital test rule is the wrong one actually used to produce the wrong historical resource value.

At operation 565, the OSP 140 looks up in the bank of diagnostic comments the one or more diagnostic comments additionally based on the certain additional candidate digital test rule.

In some embodiments, in order to determine whether the difference between the respective trusted resource value and the respective historical resource value was due to using an outdated rule, the OSP 140 reads from the dataset a time value that represents a time associated with when the respective historical relationship instance represented by the dataset occurred. The OSP 140 then selects a test time value indicating a time prior to the time value. The OSP 140 may then include in the additional candidate digital test rules to be tested one or more outdated digital rules associated with the test time value.

In some embodiments, in order to determine whether and how the difference between the respective trusted resource value and the respective historical resource value was attributable to rules related to particular individual elements of a relationship instance (e.g., elements represented by ancillary parameter values, such as AV11, AV12, in a dataset), for each test element of a plurality of test elements in the dataset that represents the respective historical relationship instance, the OSP 140 may identify a candidate digital test rule from the test element. The OSP then includes, in the additional candidate digital test rules to be tested, the identified candidate digital test rule. For example, the test element may be regarding a geographical location of a secondary entity associated with the respective historical relationship instance represented by the dataset. As another example, in some embodiments, the OSP 140 may identify a parameter name associated with the test element and determine a message element based on the parameter name. The OSP 140 may then include in the diagnostic comments the determined message element based on the identified candidate digital test rule being the certain additional candidate digital test rule that was selected based on the detected test resource value. In some instances, the determined message element may be the parameter name (e.g., the geographical location).

The method 500 may then end at 570.

Figure 6:
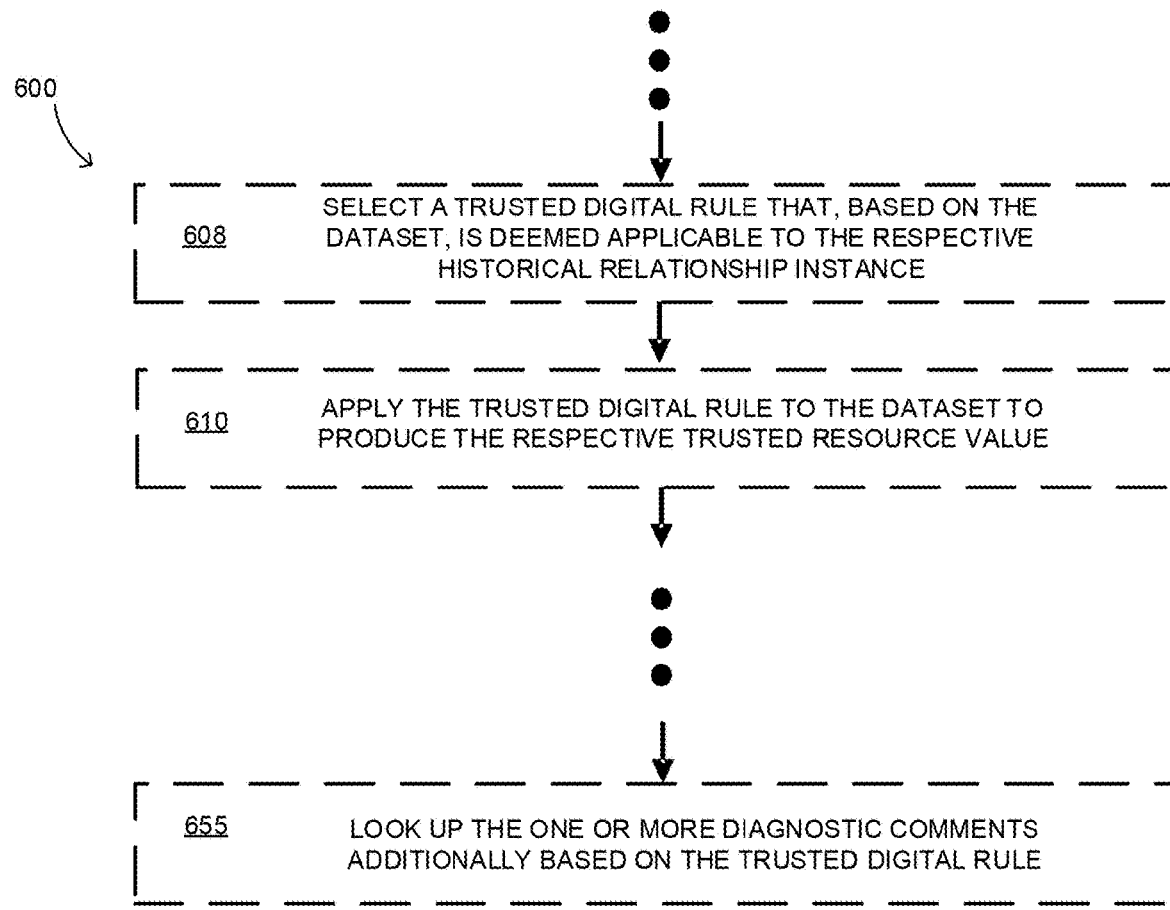
FIG. 6 is a partial flow diagram of sample operations that can be optionally added to the flowchart of FIG. 5 according to embodiments.

FIG. 6 is a partial flow diagram of sample operations 600 that can be optionally added to the flowchart of FIG. 3 according to embodiments.

At operation 608, the OSP 140 selects a trusted digital rule that, based on the dataset, is deemed applicable to the respective historical relationship instance.

At operation 608, the OSP 140 applies the trusted digital rule to the dataset to produce the respective trusted resource value.

At operation 655, (e.g. during operation 340 o FIG. 3) the OSP 140 then looks up one or more diagnostic comments additionally based on the trusted digital rule. For example, the OSP 140 may look up the one or more diagnostic comments based on the test resource value produced by applying the certain candidate digital test rule to the dataset matching the HRV associated with the dataset and also based on the trusted digital rule deemed applicable to the respective historical relationship instance represented by the dataset being different than the certain candidate digital test rule.

Figure 7:
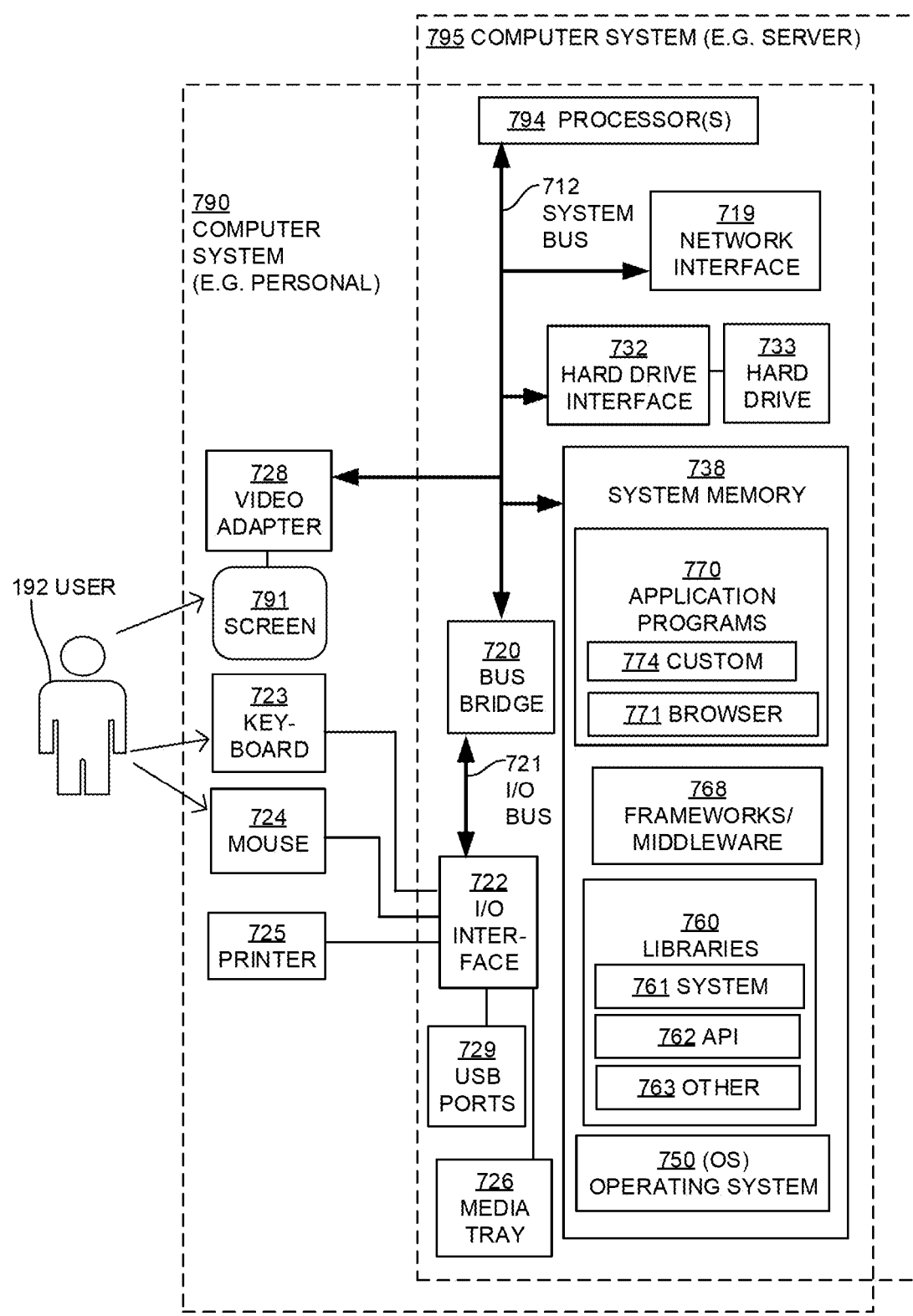
FIG. 7 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein.

FIG. 7 is a block diagram illustrating components of an exemplary computer system 790 and a sample computer system 795 according to some exemplary embodiments, which may read instructions from a machine-readable medium (e.g., a non-transitory computer-readable medium) and perform any one or more of the processes, methods, and/or functionality discussed herein. The computer system 795 may be a server, while the computer system 790 may be a personal device, such as a personal computer, a desktop computer, a personal computing device such as a laptop computer, a tablet computer, a mobile phone, and so on. Either type may be used for the computer system 112 and 190 of FIG. 1, a computer system that is part of ERP 199 and/or a computer system that is part of any entity or system shown in any of the Figures of the present disclosure.

The computer system 795 and the computer system 790 have similarities, which FIG. 7 exploits for purposes of economy in this document. It will be understood, however, that a component in the computer system 795 may be implemented differently than the same component in the computer system 790. For instance, a memory in a server may be larger than a memory in a personal computer, and so on. Similarly, custom application programs 774 that implement embodiments may be different, and so on.

The computer system 795 includes one or more processors 794. The processor(s) 794 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 794 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 795, or the computer system 790, are not intended to be exhaustive. Rather, they are representative, for highlighting essential components that can be used with embodiments.

The computer system 795 also includes a system bus 712 that is coupled to the processor(s) 794. The system bus 712 can be used by the processor(s) 794 to control and/or communicate with other components of the computer system 795.

The computer system 795 additionally includes a network interface 719 that is coupled to system bus 712. Network interface 719 can be used to access a communications network, such as the network 194. Network interface 719 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 795 also includes various memory components. These memory components include memory components shown separately in the computer system 795, plus cache memory within the processor(s) 794. Accordingly, these memory components are examples of non-transitory machine-readable media. The memory components shown separately in the computer system 795 are variously coupled, directly or indirectly, with the processor(s) 794. The coupling in this example is via the system bus 712.

Instructions for performing any of the methods or functions described in this document may be stored, completely or partially, within the memory components of the computer system 795, etc. Therefore, one or more of these non-transitory computer-readable media can be configured to store instructions which, when executed by one or more processors 794 of a host computer system such as the computer system 795 or the computer system 790, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 795 include a non-volatile hard drive 733. The computer system 795 further includes a hard drive interface 732 that is coupled to the hard drive 733 and to the system bus 712.

The memory components of the computer system 795 include a system memory 738. The system memory 738 includes volatile memory including, but not limited to, cache memory, registers and buffers. In embodiments, data from the hard drive 433 populates registers of the volatile memory of the system memory 738.

In some embodiments, the system memory 738 has a software architecture that uses a stack of layers, with each layer providing a particular functionality. In this example the layers include, starting from the bottom, an Operating System (OS) 750, libraries 760, frameworks/middleware 768 and application programs 770, which are also known as applications 770. Other software architectures may include less, more or different layers. For example, a presentation layer may also be included. For another example, some mobile or special purpose operating systems may not provide a frameworks/middleware 768.

The OS 750 may manage hardware resources and provide common services. The libraries 760 provide a common infrastructure that is used by the applications 770 and/or other components and/or layers. The libraries 760 provide functionality that allows other software components to perform tasks more easily than if they interfaced directly with the specific underlying functionality of the OS 750. The libraries 760 may include system libraries 761, such as a C standard library. The system libraries 761 may provide functions such as memory allocation functions, string manipulation functions, mathematical functions, and the like.

In addition, the libraries 760 may include API libraries 762 and other libraries 463. The API libraries 762 may include media libraries, such as libraries to support presentation and manipulation of various media formats such as MPEG4, H.264, MP3, AAC, AMR, JPG, and PNG. The API libraries 762 may also include graphics libraries, for instance an OpenGL framework that may be used to render 2D and 3D in a graphic content on the screen 791. The API libraries 762 may further include database libraries, for instance SQLite, which may support various relational database functions. The API libraries 762 may additionally include web libraries, for instance WebKit, which may support web browsing functionality, and also libraries for applications 770.

The frameworks/middleware 768 may provide a higher-level common infrastructure that may be used by the applications 770 and/or other software components/modules. For example, the frameworks/middleware 768 may provide various Graphic User Interface (GUI) functions, high-level resource management, high-level location services, and so forth. The frameworks/middleware 768 may provide a broad spectrum of other APIs that may be used by the applications 770 and/or other software components/modules, some of which may be specific to the OS 750 or to a platform.

The application programs 770 are also known more simply as applications and apps. One such app is a browser 771, which is a software that can permit the user 193 to access other devices in the internet, for example while using a Graphic User Interface (GUI). The browser 771 includes program modules and instructions that enable the computer system 795 to exchange network messages with a network, for example using Hypertext Transfer Protocol (HTTP) messaging.

The application programs 770 may include one or more custom applications 774, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 770 may include a contacts application, a book reader application, a word processing application, a location application, a media application, a messaging application, and so on. Applications 770 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 770 may use built-in functions of the OS 750, of the libraries 460, and of the frameworks/middleware 768 to create user interfaces for the user 193 to interact with.

The computer system 795 moreover includes a bus bridge 720 coupled to the system bus 712. The computer system 795 furthermore includes an input/output (I/O) bus 721 coupled to the bus bridge 720. The computer system 795 also includes an I/O interface 722 coupled to the I/O bus 721.

For being accessed, the computer system 795 also includes one or more Universal Serial Bus (USB) ports 729. These can be coupled to the I/O interface 722. The computer system 795 further includes a media tray 726, which may include storage devices such as CD-ROM drives, multimedia interfaces, and so on.

The computer system 790 may include many components similar to those of the computer system 795, as seen in FIG. 7. In addition, a number of the application programs may be more suitable for the computer system 790 than for the computer system 795.

The computer system 790 further includes peripheral input/output (I/O) devices for being accessed by a user more routinely. As such, the computer system 790 includes a screen 791 and a video adapter 728 to drive and/or support the screen 791. The video adapter 728 is coupled to the system bus 712.

The computer system 790 also includes a keyboard 723, mouse 724, and a printer 725. In this example, the keyboard 723, the mouse 724, and the printer 725 are directly coupled to the I/O interface 722. Sometimes this coupling is wireless or may be via the USB ports 729.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 794.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

OPERATIONAL EXAMPLES—USE CASES

Figure 8:
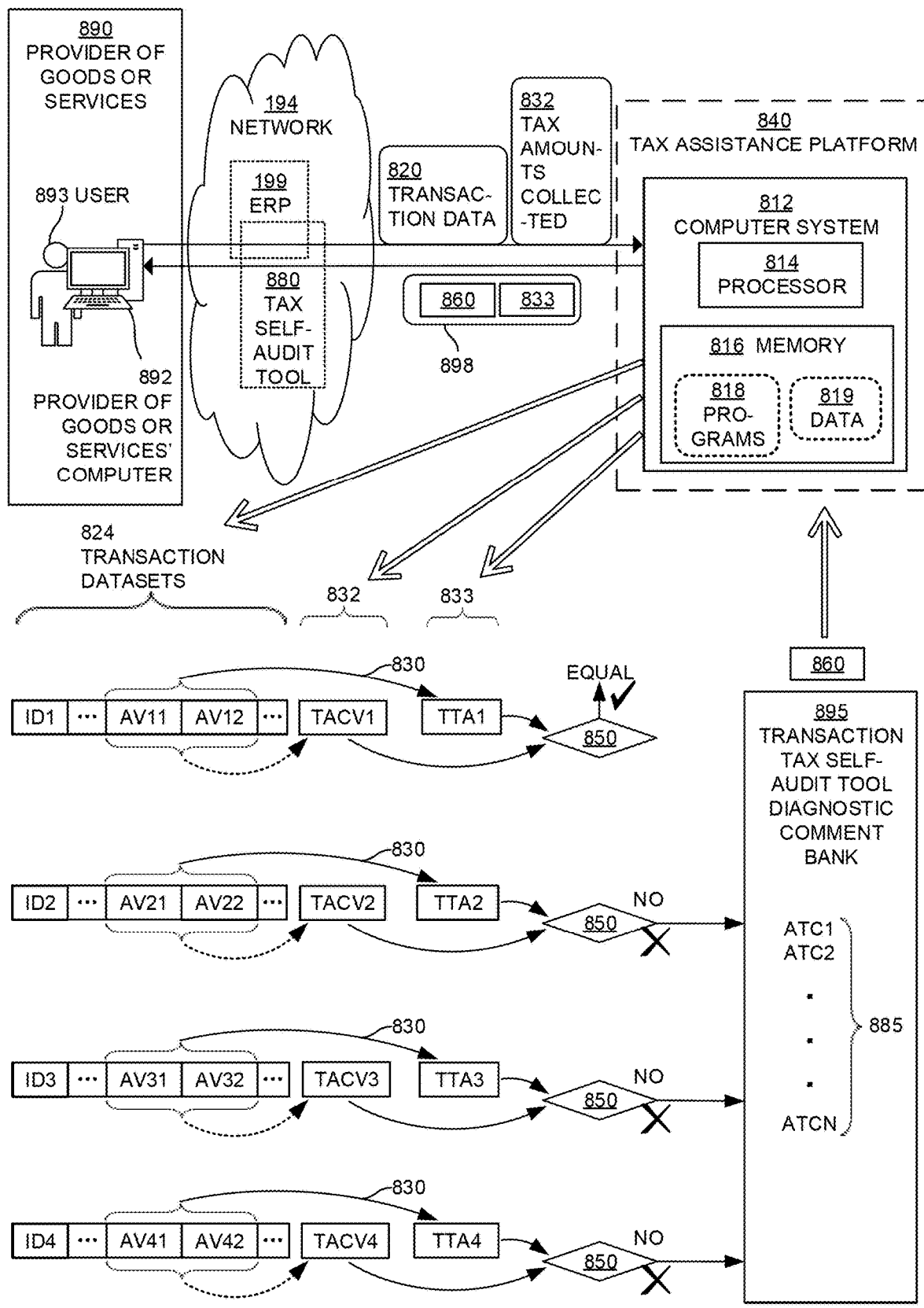
FIG. 8 is a diagram of sample aspects for describing operational examples and use cases of embodiments.

The above-mentioned embodiments have one or more uses. Aspects presented below may be implemented as was described above for similar aspects. (Some, but not all, of these aspects have even similar reference numerals.) FIG. 8 is a diagram of sample aspects for describing operational examples and use cases of embodiments. It will be recognized that aspects of FIG. 8 have similarities with aspects of FIG. 1. Portions of such aspects may be implemented as described for analogous aspects of FIG. 1.

FIG. 8 shows aspects of a sample computer system 812 of a tax assistance platform 840, according to embodiments. The computer system 812 includes at least a processor 814 and a memory 816. There can be one or more processors, but only one processor 814 is shown. The memory 816 can be a non-transitory computer-readable storage medium. The memory 816 can be configured to store programs 818 and data 819. Programs 818 can include instructions which, when executed by processor 814, result in operations of embodiments disclosed herein. More details about how the computer system 812 can be made are provided with reference to FIG. 7.

As an example use case, a provider of goods or services 890, such as a seller, must collect transaction tax (e.g., sales tax) according to the correct tax rate for the tax jurisdictions authorized to collect tax on a transaction. These rates often change, and sellers are not able to keep their invoicing and other ERP systems up to date. When this happens, the tax rates in the seller's system is often outdated and, as a result, the seller ends up collecting the wrong tax amount (or not tax) based on the wrong or outdated tax rates.

The tax assistance platform 840 and/or tax self-audit tool 880 (e.g., provided by the tax assistance platform 840) will scan the provider of goods or services' computer 892 and/or ERP 199 for transaction data 820. The transaction data 820 includes transaction datasets 824 and associated tax amounts collected 832 for each sales transaction. The tax assistance platform 840 and/or tax self-audit tool 880 then runs the transactions represented by transaction data 820 for a mock calculation represented by arrow 830. The tax assistance platform 840 and/or tax self-audit tool 880 will receive the tax jurisdictions and the tax rates applicable for each tax jurisdiction for dates of those historical transactions and use digital rules based on such information to run the mock calculations represented by lines 830 based on one or more ancillary parameter values associated with the transaction (e.g., location of buyer or seller, types of goods or services, date of transaction, total value of transactions including the transaction combined with other applicable transactions of the seller, total number of transactions including the transaction combined with other applicable transactions of the seller, type of transaction, other characteristics of the transaction, etc.).

The mock calculations result in trusted tax amounts 833 that should have been collected for each transaction that is represented by a respective transaction dataset of transaction datasets 824. Now, using this information, at operation 850, the tax assistance platform 840 and/or tax self-audit tool 880 compares the trusted tax amounts 833 calculated for each transaction with the tax amount collected by the provider of goods and services 890 and determines whether, and possibly how, they differ. The tax assistance platform 840 and/or tax self-audit tool 880 then summarizes the tax rates collected for various jurisdictions and indicates in a summary or a report whether these rates were correct or wrong at the time of the respective sales transaction. This summary will be exposed to the user in the form of audit exposure report (e.g., a report such as that shown in FIG. 12). The summary will also be able to tell user 893 whether the user 893 under-collected or over-collected for a given jurisdiction. The summary or report may instead or also include diagnostic comments selected from the tax self-audit tool diagnostic comment bank 895 that provide clues, reasons or other comments regarding possible causes for the incorrect tax amount being collected for a given jurisdiction.

For example, the tax amount collected value (TACV1) collected by the provider of goods or services 890 for the transaction represented by the dataset identified by ID1 is compared at operation 850 to the trusted tax amount (TTA1) calculated for that transaction (i.e., the tax amount that should have been collected for that transaction based on updated tax regulations accessed by the tax assistance platform 840). In the present example, at operation 850 the TACV1 is determined to be equal to TTA1, so the tax assistance platform 840 and/or tax self-audit tool 880 determines the correct amount of tax was collected for that transaction and moves on the next dataset in the transaction datasets 824 representing the next transaction.

The TACV2 collected by the provider of goods or services 890 for the transaction represented by the dataset identified by ID2 is compared at operation 850 to TTA2 calculated for that transaction (i.e., the tax amount that should have been collected for that transaction based on updated tax regulations accessed by the tax assistance platform 840). In the present example, at operation 850 TACV2 is determined to be different than TTA2, so the tax assistance platform 840 and/or tax self-audit tool 880 determines the incorrect amount of tax was collected for that transaction and moves on the next dataset in the transaction datasets 824 representing the next transaction.

The TACV3 collected by the provider of goods or services 890 for the transaction represented by the dataset identified by ID3 is compared at operation 850 to TTA3 calculated for that transaction (i.e., the tax amount that should have been collected for that transaction based on updated tax regulations accessed by the tax assistance platform 840). In the present example, at operation 850 TACV3 is determined to be different than TTA3, so the tax assistance platform 840 and/or tax self-audit tool 880 determines the incorrect amount of tax was collected for that transaction and moves on the next dataset in the transaction datasets 824 representing the next transaction.

The TACV4 collected by the provider of goods or services 890 for the transaction represented by the dataset identified by ID4 is compared at operation 850 to TTA4 calculated for that transaction (i.e., the tax amount that should have been collected for that transaction based on updated tax regulations accessed by the tax assistance platform 840). In the present example, at operation 850 TACV4 is determined to be different than TTA4, so the tax assistance platform 840 and/or tax self-audit tool 880 determines the incorrect amount of tax was collected for that transaction and moves on the next dataset in the transaction datasets 824 representing the next transaction.

In some embodiments, for each incorrect tax amount collected (e.g., for TACV2, TACV3 and TACV4) the tax assistance platform 840 and/or tax self-audit tool 880 looks up in the transaction tax self-audit tool diagnostic comment bank 895 one or more applicable diagnostic comments 860 that, based on the difference detected between the tax amount collected and the trusted tax amount, may provide clues or reasons why the incorrect tax amount was collected. In some embodiments, the transaction tax self-audit tool diagnostic comment bank 895 may store a plurality of transaction tax self-audit tool diagnostic comments ATC1, ATC2, . . . ATCN 885, that may provide clues, reasons or other comments regarding possible causes for the incorrect tax amount being collected. For example, the reason for the incorrect tax amount being collected may be due to an outdated or incorrect tax regulation being used by another system to calculate the sales tax due for the transaction.

The tax assistance platform 840 may then push, send, or otherwise cause to be transmitted the looked-up applicable transaction tax self-audit tool diagnostic comments 860 to the tax self-audit tool 880 and/or the provider of goods or services' computer 892 in a message 898. The tax self-audit tool 880 reads the diagnostic comments 860 and forwards the diagnostic comments 860 to the provider of goods or services' computer 892. For example, the tax self-audit tool 880 causes at least some of the diagnostic comments 860 to be presented on a user interface of provider of goods or services' computer 892. Such diagnostic comments 860 may be transmitted (e.g., via message 898) and presented on the user interface of provider of goods or services' computer 892 with or in the context of other data generated, provided and/or otherwise produced by the tax assistance platform 840, such as the trusted tax amounts 833 sent as part of message 898. In some embodiments the tax self-audit tool 880 is part of the tax assistance platform 840, which can be implemented as software as SaaS provided to the provider of goods or services 890, either directly or via the ERP 199.

In embodiments, digital rules based on an outdated or incorrect tax regulations that were possibly used by another system to calculate the sales tax due for the transaction may be selected or determined according to the systems and methods illustrated and described herein with respect to FIGS. 1-6 in order to further identify which, if any, of the transaction tax self-audit tool diagnostic comments 885 are applicable for a particular transaction or group of transactions. Examples of various transaction tax self-audit tool diagnostic comments in various use cases and the associated detected differences between the tax amount collected and the trusted tax amount that may cause particular diagnostic comments to be selected (or codes representing such differences) are provided in FIGS. 9-11.

FIG. 9 is a table 902 of sample of detected differences 904 between transaction tax amounts collected and trusted transaction tax amounts, which are each associated sample transaction tax self-audit tool diagnostic comments 985 based on those differences according to embodiments. In various embodiments, the sample transaction tax self-audit tool diagnostic comments 985 may be stored in the transaction tax self-audit tool diagnostic comment bank 895 and may comprise or be included in the plurality of transaction tax self-audit tool diagnostic comments 885.

For example, in a case where the tax assistance platform 840 and/or tax self-audit tool 880 determines for a particular transaction (e.g., at operation 850) that the tax amount that was collected (i.e., the "historical" amount) is zero and the calculated trusted tax amount (i.e., the "new" amount) is not zero, then the transaction tax self-audit tool diagnostic comment selected from the transaction tax self-audit tool diagnostic comments 885 is "Are you sure that your provider checked whether a certificate of exemption has expired? Are you sure that your provider checked that there are no tax holidays in this jurisdiction? And maybe TAX COLLECTED". Thus, the selected diagnostic comment provides clues or reasons as to why the incorrect tax amount (or no tax) was collected. This selection is based on the association in the table 902 between that particular detected difference and the diagnostic comment. In some embodiments, such associations may be stored in a database, data structure or logic resembling or represented by table 902 in the transaction tax self-audit tool diagnostic comment bank 895, the tax assistance platform 840 and/or the tax self-audit tool 880.

Figure 10:
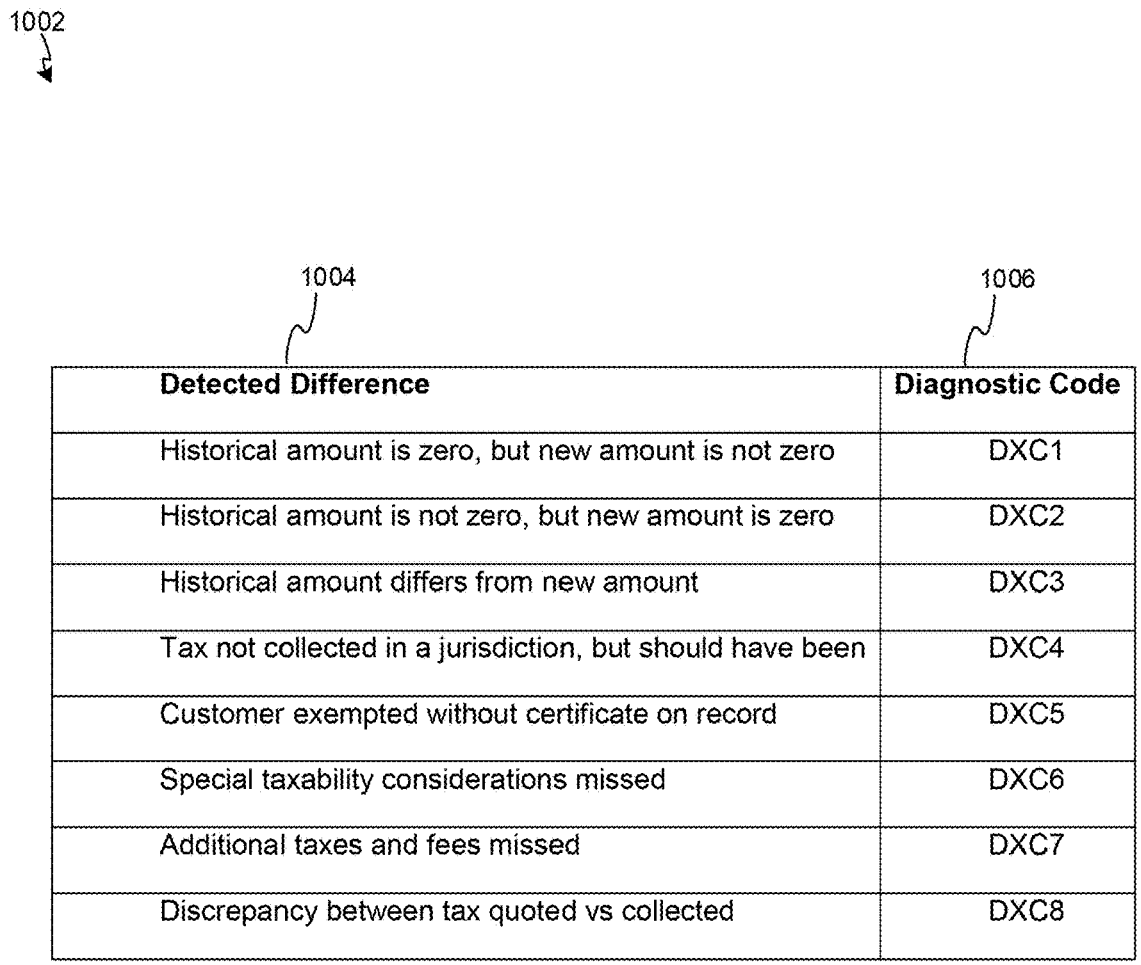
FIG. 10 is a table of sample of detected differences between transaction tax amounts collected and trusted transaction tax amounts, which are each associated with a sample transaction tax self-audit tool diagnostic comment code according to embodiments.

FIG. 10 is a table 1002 of sample of detected differences 1004 between transaction tax amounts collected and trusted transaction tax amounts, which are each associated with one of a plurality of sample transaction tax self-audit tool diagnostic comment codes 1006, according to embodiments. In the present example, the detected differences 1004 are or represent the detected differences 904 between transaction tax amounts collected and trusted transaction tax amounts shown in FIG. 9. Each detected difference of detected differences 904 is associated with a unique diagnostic code of diagnostic codes that may be used by the transaction tax self-audit tool diagnostic comment bank 895, the tax assistance platform 840 and/or the tax self-audit tool 880 to identify the detected difference. In particular, the tax self-audit tool diagnostic comment codes (DXC1, DXC2, . . . DXC8) 1006 of FIG. 10 may each be generated from and associated with a different particular detected difference. In some embodiments, such associations between the detected differences 1004 and the plurality of sample transaction tax self-audit tool diagnostic comment codes 1006 may be generated, and/or stored in a database, data structure or logic resembling or representing table 1002, by the transaction tax self-audit tool diagnostic comment bank 895, the tax assistance platform 840 and/or the tax self-audit tool 880.

FIG. 11 is a table 1102 of sample transaction tax self-audit tool diagnostic comment codes 1006, which are the same sample transaction tax self-audit tool diagnostic comment codes 1006 of FIG. 10, and which are each associated with a sample transaction tax self-audit tool diagnostic comment of FIG. 9 according to embodiments. In the present example, tale 1102 includes a plurality of transaction tax self-audit tool diagnostic comments 1185, which may include or be comprised of the plurality of transaction tax self-audit tool diagnostic comments 985 of FIG. 9. The sample transaction tax self-audit tool diagnostic comment codes 1006 are used by the tax self-audit tool diagnostic comment bank 895, the tax assistance platform 840 and/or the tax self-audit tool 880 to identify which of the plurality of transaction tax self-audit tool diagnostic comments 1185 to select when a particular difference associated with the particular diagnostic comment code is detected by the tax assistance platform 840 and/or the tax self-audit tool 880.

For example, in a use case where the tax assistance platform 840 and/or tax self-audit tool 880 determines for a particular transaction (e.g., at operation 850) that the tax amount that was collected (i.e., the "historical" amount) is zero and the calculated trusted tax amount (i.e., the "new" amount) is not zero, then the transaction tax self-audit tool diagnostic comment selected from the transaction tax self-audit tool diagnostic comments 885 is a comment identified by the code "DXC1" based on the table 1002. The tax assistance platform 840 and/or tax self-audit tool 880 may then refer to table 1102 and find the code "DXC1" in the transaction tax self-audit tool diagnostic comment codes 1006 to extract the text of the comment, which is "Are you sure that your provider checked whether a certificate of exemption has expired? Are you sure that your provider checked that there are no tax holidays in this jurisdiction? And maybe TAX COLLECTED". The tax assistance platform 840 and/or tax self-audit tool 880 then outputs this text as the one or more applicable diagnostic comments 860 that, based on the difference detected between the tax amount collected and the trusted tax amount, may provide clues or reasons why the incorrect tax amount was collected.

Figure 12:
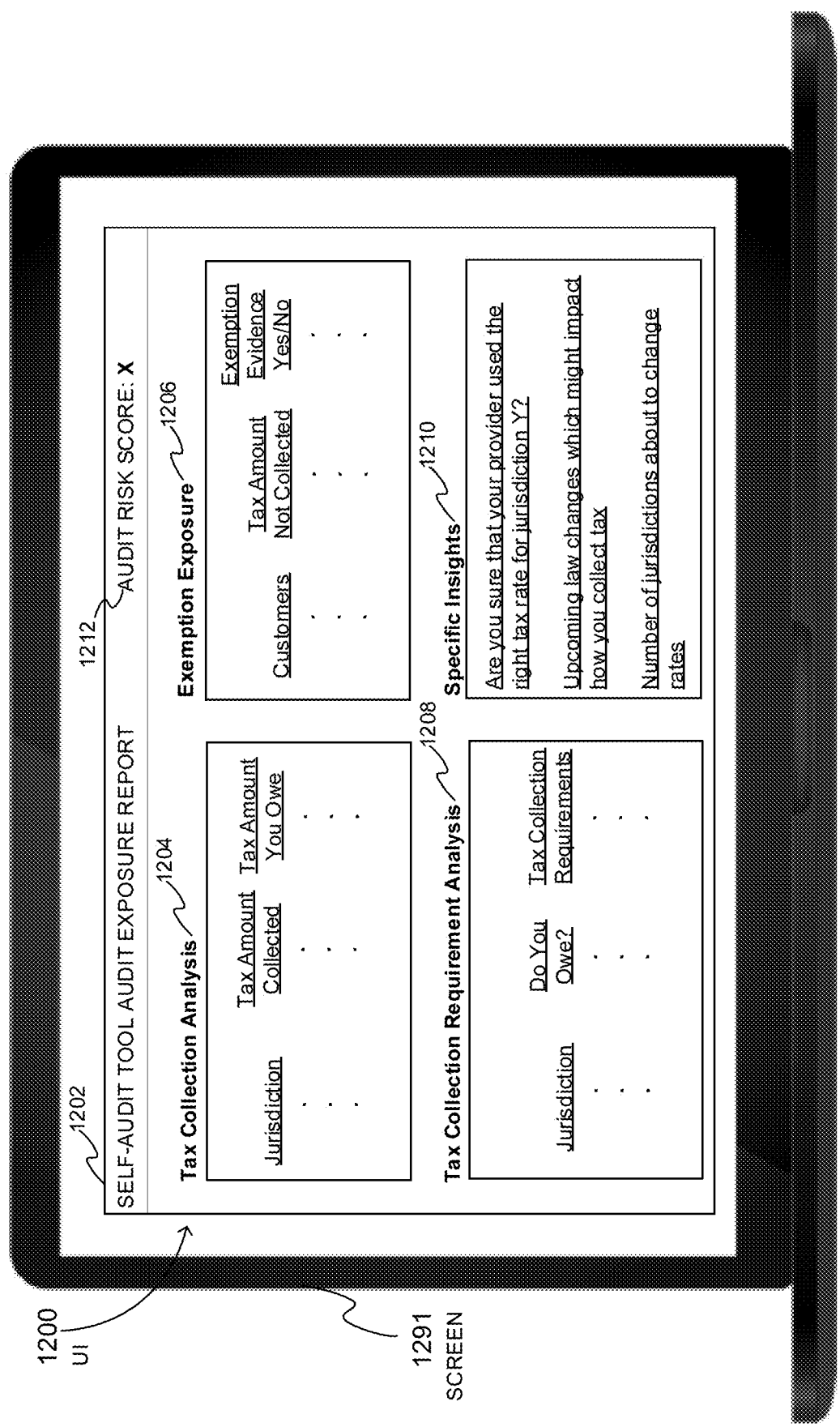
FIG. 12 shows a sample User Interface (UI) with elements of a sample audit exposure report from the transaction tax self-audit tool of FIG. 8.

FIG. 12 shows a sample User Interface (UI) 1200 with elements of a sample audit exposure report from the transaction tax self-audit tool 880 of FIG. 8. The UI 1200 may be a graphical user interface (GUI) of the provider of goods or services' computer 892 of other device of user 893. For example, the screen 1291 may be the screen 791 of the example computer system 790 FIG. 7. The tax assistance platform 840 and/or the tax self-audit tool 880 may cause the UI 1200 to be presented on the provider of goods or services' computer 892 of other device of user 893. In embodiments, the UI 1200 may be integrated with a UI of the ERP 199 and/or tax assistance platform 840. The UI 1200 may include information output by the transaction tax self-audit tool diagnostic comment bank 895, the tax assistance platform 840 and/or the tax self-audit tool 880, and which was received via message 898 of FIG. 8, such as, for example, one or more applicable diagnostic comments 860 that, based on the difference detected between the tax amount collected and the trusted tax amount, may provide clues or reasons why the incorrect tax amount was collected. In some embodiments, the UI 1200 may include trusted tax amounts 833 sent as part of message 898.

In the present example, UI 1200 presents a Self-audit Tool Audit Exposure Report 1202 for the provider of goods or services 890 based on the transaction data 820 and associated tax amounts collected 832.

The Self-audit Tool Audit Exposure Report 1202 may include an audit risk score 1212 based on how many and what percent of the provider of the goods or services' transactions are wrong, and by how much the overages and underages for sales tax collection differ from what should have been collected.

The UI 1200 may also include a Tax Collection Analysis section 1204 that includes a list of applicable tax jurisdictions, the tax amount collected for each tax jurisdiction and the tax amount owed, if any, for each tax jurisdiction.

The UI 1200 may also include an exemption exposure section 1206 that includes an applicable list of customers of the provider of goods or services 890 for which no tax amount was collected for one or more transactions, the tax amount that was not collected (which may have otherwise been due) for each customer, and whether the tax assistance platform 840 and/or the tax self-audit tool 880 found any exemption evidence (e.g., in the ERP 199 or computer system 892) that would warrant not collecting tax that would otherwise be due.

The UI 1200 may also include a Tax Collection Requirement Analysis section 1208 that includes a list of applicable tax jurisdictions, whether the provider of goods or services 890 owes tax that should have been collected for each jurisdiction and the applicable tax collection requirements for that jurisdiction.

The UI 1200 may also include a specific Insights section 1210 that may include diagnostic comments, such as, for example, one or more applicable comments of the transaction tax self-audit tool diagnostic comments 885 that may provide clues, reasons or other comments regarding possible causes for the incorrect tax amount being collected for a given jurisdiction as selected and described herein. In the present example, the diagnostic comment "Are you sure that your provider used the right tax rate for jurisdiction Y?", which may indicate that, based on the based on a difference detected between the tax amount collected and the calculated trusted tax amount, an incorrect tax rate was used by the provider of goods or services 890. Other insights may also be presented, such as those regarding upcoming law changes which may impact how the provider of goods or services 890 collects tax and a number of jurisdictions that are about to change tax rates. In various embodiments, each item underlined in FIG. 12 may be a link to further detailed information about that item or information on how to get further access to the tax assistance platform for automated assistance regarding that item.

For example, the transaction data 820 and associated tax amounts collected 832 for each sales transaction can generate intelligent insights using the systems and methods described herein. These intelligent insights may be based on changing compliance laws, taxability rules and general practice for tax collection in normal scenarios. These intelligent insights are meant to be useful for user from audit risk assessment perspective as well as spark their interest in automating tax calculation to a tax returns filing workflow. For example, the tax assistance platform 840 and/or tax self-audit tool 880 may look at a past years' invoices and report (via the Self-audit Tool Audit Exposure Report 1202) on one or more of: overall rate discrepancy burden (amount of sales vs. tax collected); number of sales invoices with exemptions but with no exemption certificate or reseller number record; dollar amount of sales on which the provider of the goods or services 890 did not collect tax for specific states or other jurisdictions; states or other jurisdictions where the provider of the goods or services 890 crossed economic sales threshold/remote seller threshold and have not started collecting tax yet; items for which attract advance taxability and applying a tangible personal property rate would be wrong; items and sales scenarios where the provider of the goods or services 890 is liable to collect other types of taxes and fees in addition to sales tax (e.g. bottle tax, eWaste, etc.); discrepancies between tax amount quoted vs. collected; whether the seller of goods or services should register as a remote seller in one or more of the plurality of tax jurisdictions; based on a determination that transaction tax was not collected for the transaction, whether documentation was collected regarding a tax exemption status of a recipient of goods or services for the transaction according to the regulations; based on comparison of one or more of the transactions tax amounts collected for the plurality of historical transactions to one or more of the plurality of trusted transaction tax amounts, determining, for each transaction of the plurality historical transactions, whether, according to the regulations, a tax exemption could have been applied to the transaction based on goods or services of the transaction, but was not; etc.

In some embodiments, the tax assistance platform 840 and/or the tax self-audit tool 880 may present follow up actions as facts and questions, for example interesting new sales tax collection facts and/or asking the user 893 a question (e.g. "Do you know the form you need to file in XYZ state or a local jurisdiction?"), such as in the specific insights section 1210.

In various embodiments, the tax assistance platform 840 and/or tax self-audit tool 880 further produces a first invoice associated with the Self-audit Tool Audit Exposure Repot 1202. If the provider of goods or services 890 is also a customer of the tax assistance platform 840, the tax assistance platform 840 may pay this first invoice. In some embodiments, where the provider of goods or services 890 is not also a customer of the tax assistance platform 840, the tax assistance platform 840 and/or tax self-audit tool 880 may further generate an estimated invoice, for indicating to the provider of goods or services 890 what the cost would be for the provider of goods or services 890 to have been using the tax assistance platform 840, and therefore not to have to do the audit.

In some embodiments, the provider of goods or services' data, such as sales data, resides in an environment like ERP 199. In this way, the provider of goods or services need not enter anything in the tax assistance platform 840 and/or tax self-audit tool 880, or set up anything; rather, with a little information (e.g., as little as the e-mail of the user 893), the provider of goods or services can get started using the tax assistance platform 840 and/or tax self-audit tool 880 to generate the Self-audit Tool Audit Exposure Repot 1202.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

The invention claimed is:

1. A computer system including at least:
   one or more processors; and
   one or more non-transitory computer-readable storage media having stored thereon instructions which, when executed by the one or more processors, result in operations including at least:

receiving, from a system associated with a primary entity, historical relationship instance data regarding a plurality of historical relationship instances between the primary entity and a plurality of secondary entities, in which the historical relationship instance data includes a plurality of datasets and each dataset of the plurality of datasets represents a respective historical relationship instance of the plurality of historical relationship instances;

receiving, from the system associated with the primary entity, a plurality of historical resource values, in which each historical relationship instance of the plurality of historical relationship instances is associated with a respective historical resource value of the plurality of historical resource values; and for each dataset of the plurality of datasets:
producing a respective trusted resource value associated with the dataset based on the respective historical relationship instance represented by the dataset;
comparing the respective trusted resource value with the respective historical resource value associated with the dataset;
based on the comparison, detecting whether there is a difference between the respective trusted resource value and the respective historical resource value associated with the dataset; and
in response to a detection there is a difference between the respective trusted resource value and the respective historical resource value associated with the dataset:
accessing a bank of diagnostic comments;
looking up in the bank of diagnostic comments, based on the detected difference, one or more diagnostic comments associated with the detected difference;
outputting the at least one of the one or more diagnostic comments associated with the detected difference; and
causing the at least one of the one or more outputted diagnostic comments to be presented on a user interface,
selecting, based on the dataset, a candidate digital test rule;
producing a respective test resource value based on applying the candidate digital test rule to the dataset;
determining whether the respective test resource value matches the respective historical resource value; and
if so, looking up in the bank of diagnostic comments the one or more diagnostic comments additionally based on the candidate digital test rule;
selecting, based on the dataset, additional candidate digital test rules;
producing respective test resource values based on applying the additional candidate digital test rules to the dataset;
detecting that a certain one of the respective test resource values matches the respective historical resource value;
selecting a certain one of the additional candidate digital test rules based on the detected test resource value; and
looking up in the bank of diagnostic comments the one or more diagnostic comments additionally based on the certain additional candidate digital test rule.

2. The system of claim 1 in which the instructions, when executed by the one or more processors, further result in operations including at least:

outputting an element of the dataset along with the at least one of the one or more diagnostic comments in which the element of the dataset is associated with the respective historical relationship instance.

3. The system of claim 1 in which the producing the respective trusted resource value includes:
selecting a trusted digital rule that, based on the dataset, is deemed applicable to the respective historical relationship instance; and
applying the trusted digital rule to the dataset to produce the respective trusted resource value.

4. The system of claim 1 in which the instructions, when executed by the one or more processors, further result in operations including at least:
generating a respective difference value associated with the dataset representing the difference, and
in which the one or more diagnostic comments are looked up from the respective difference value.

5. The system of claim 1 in which comparing the respective trusted resource value with the respective historical resource value includes at least:
determining whether the respective trusted resource value is zero while the respective historical resource value is non-zero.

6. The system of claim 1 in which comparing the respective trusted resource value with the respective historical resource value includes at least:
determining whether the respective trusted resource value is non-zero while the respective historical resource value is zero.

7. The system of claim 1 in which the instructions, when executed by the one or more processors, further result in operations including at least:
in response to the detection there is a difference between the respective trusted resource value and the respective historical resource value, generating a diagnostic code from the detected difference; and
in which looking up in the bank of diagnostic comments is performed from the diagnostic code.

8. The system of claim 1 in in which the instructions, when executed by the one or more processors, further result in operations including:
selecting a trusted digital rule that, based on the dataset, is deemed applicable to the respective historical relationship instance;
applying the trusted digital rule to the dataset to produce the respective trusted resource value; and
in which the one or more diagnostic comments are looked up additionally based on the trusted digital rule.

9. The system of claim 1 in which the selecting the additional candidate digital test rules includes:
reading from the dataset a time value that represents a time associated with when the respective historical relationship instance represented by the dataset occurred;
selecting a test time value indicating a time prior to the time value; and
including in the additional candidate digital test rules one or more outdated digital rules associated with the test time value.

10. The system of claim 1 in which the selecting the additional candidate digital test rules includes:
for each test element of a plurality of test elements in the dataset that represents the respective historical relationship instance:
identifying a candidate digital test rule from the test element; and including in the candidate digital test rules the identified candidate digital test rule.

11. The system of claim 10 in which the test element is regarding a geographical location of a secondary entity, of the plurality of secondary entities, associated with the respective historical relationship instance represented by the dataset.

12. The system of claim 10 in which the instructions, when executed by the one or more processors, further result in operations including at least:
   identifying a parameter name associated with the test element;
   determining a message element based on the parameter name; and
   including in the at least one of the one or more diagnostic comments the determined message element based on the identified candidate digital test rule being the certain additional candidate digital test rule.

13. The system of claim 12 in which the determined message element is the parameter name.

14. The system of claim 1 in which the primary entity is a seller of goods or services, plurality of secondary entities is a plurality of recipients of the goods or services, the plurality of historical relationship instances are a plurality of historical transactions for the goods or services between the seller of goods or services and the plurality of recipients of the goods or services, and the producing the respective trusted resource value is according to digital rules based on regulations regarding transaction taxes for a plurality of tax jurisdictions.

15. The system of claim 14 in which the plurality of historical resource values are transaction tax amounts collected for the plurality of historical transactions, the respective trusted resource value is one of a plurality of trusted transaction tax amounts produced for the plurality of historical transactions, and the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining whether, according to the regulations, the seller of goods or services should have collected transaction tax for one or more tax jurisdictions associated with one or more of the plurality of historical transactions where the seller of goods or services did not collect transaction tax in the one or more tax jurisdictions associated with the one or more of the historical transactions.

16. The system of claim 14 in which the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining whether, according to the regulations, the seller of goods or services collected, for each transaction of the plurality of historical transactions, a correct amount of transaction tax for each applicable tax jurisdiction associated with the transaction.

17. The system of claim 14 in which the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining whether, according to the regulations, the seller of goods or services applied, for each transaction of the plurality of historical transactions, a correct transaction tax rate for each applicable tax jurisdiction associated with the transaction.

18. The system of claim 14 in which the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining whether, according to the regulations, the seller of goods or services should register as a remote seller in one or more of the plurality of tax jurisdictions.

19. The system of claim 14 in which the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining, for each transaction of the plurality of historical transactions:
      whether transaction tax was collected for the transaction; and
      based on a determination that transaction tax was not collected for the transaction, whether documentation was collected regarding a tax exemption status of a recipient of goods or services for the transaction according to the regulations.

20. The system of claim 14 in which the looking up in the bank of diagnostic comments, based on the detected difference, one or more diagnostic comments associated with the detected difference includes:
   based on comparison of one or more of the transactions tax amounts collected for the plurality of historical transactions to one or more of the plurality of trusted transaction tax amounts, determining, for each transaction of the plurality historical transactions, whether, according to the regulations, a tax exemption could have been applied to the transaction based on goods or services of the transaction, but was not.

21. The system of claim 14 in which the looking up in the bank of diagnostic comments, based on the detected difference, one or more diagnostic comments associated with the detected difference includes determining, for each tax jurisdiction of the plurality of tax jurisdictions, an amount of any transaction tax that is owed by the seller of goods or services to a tax authority of the tax jurisdiction.

22. The system of 1 in which the plurality of historical resource values is received from the system associated with a primary entity as part of the historical relationship instance data.

* * * * *